United States Patent
Oyama et al.

(10) Patent No.: US 7,862,648 B2
(45) Date of Patent: *Jan. 4, 2011

(54) HYDROTHERMALLY-STABLE SILICA-BASED COMPOSITE MEMBRANES FOR HYDROGEN SEPARATION

(75) Inventors: S. Ted Oyama, Blacksburg, VA (US); Yunfeng Gu, Painted Post, NY (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/510,963

(22) Filed: Jul. 28, 2009

(65) Prior Publication Data
US 2009/0282983 A1 Nov. 19, 2009

Related U.S. Application Data

(63) Continuation of application No. 11/381,088, filed on May 1, 2006, now Pat. No. 7,585,356.

(51) Int. Cl.
*B01D 53/22* (2006.01)
(52) U.S. Cl. .......................... 96/11; 96/4; 96/7; 96/10; 95/55; 95/56
(58) Field of Classification Search .................. 95/55, 95/56; 96/4, 7, 10–11
See application file for complete search history.

(56) References Cited

U.S. PATENT DOCUMENTS

| | | | |
|---|---|---|---|
| 5,342,431 A | 8/1994 | Anderson et al. | |
| 5,871,650 A | 2/1999 | Lai et al. | |
| 6,159,542 A | 12/2000 | Kondo et al. | |
| 6,508,860 B1 | 1/2003 | Kulkarni et al. | |
| 6,527,833 B1 | 3/2003 | Oyama et al. | |
| 6,730,364 B2 | 5/2004 | Hong et al. | |
| 6,854,602 B2 | 2/2005 | Oyama et al. | |
| 2003/0183080 A1 | 10/2003 | Mundschau | |
| 2004/0241520 A1 | 12/2004 | Ha et al. | |

OTHER PUBLICATIONS

Eversteijn, F.C.; "Low—Temperature Deposition of Alumina-Silica Films"; Philips Res. Repts 21, 379-386; 1966.

(Continued)

*Primary Examiner*—Jason M Greene
*Assistant Examiner*—Dung Bui
(74) *Attorney, Agent, or Firm*—Baker & McKenzie LLP

(57) ABSTRACT

Thin layers of a mixed composition are deposited on a porous substrate by chemical vapor deposition in an inert atmosphere at high temperature. The resulting membrane has excellent stability to water vapor at high temperatures. An exemplary membrane comprises an amorphous mixed-element surface layer comprising silica and at least one oxide of additional element, an optional porous substrate on which said surface layer is deposited, and a porous support on which said substrate or mixed-element surface layer is deposited, wherein the permeance of the membrane is higher than $1\times10^{-7}$ mol $m^{-2}s^{-1}Pa^{-1}$ and the selectivity of $H_2$ over CO, $CO_2$, and $CH_4$ is larger than 100, and wherein the $H_2$ permeance of the membrane after exposure to a stream containing 60 mol % water vapor at 673 K for 120 h is at least 50% of its initial $H_2$ permeance.

20 Claims, 25 Drawing Sheets

OTHER PUBLICATIONS deVos, Renate M., et al. ; "Hydrophobic Silica Membranes for Gas Separation"; Journal of Membrance Science 158; 1999; 277-288.

Yoshida, Kazuhiro, et al.; "Hydrothermal Stability and Performance of Silica-Zirconia membranes for Hydrogen Separation in Hydrothermal Conditions"; Journal of Chemical Engineering of Japan; 2001; vol. 34, 523-530.

Nam, Suk Woo, et al.; "Hydrogen-Permselective TiO2/SiO2 Membranes Formed by Chemical Vapor Deposition"; Korean Membrane Journal; Dec. 2001; vol. 3 No. 1; 69-74.

Wu, J.C.S., et al.;"Characterization of Hydrogen-Permselective Microporous Ceramic Membranes"; Journal of membrane Science 96; 1994; 275-287.

Lin, Y.S., et al.; "Microporous Inorganic Membranes"; Separation and Purification Methods; vol. 31, No. 2, 2002; 229-379; Marcel Dekker, Inc.; USA.

Sea, Bong-Kuk, et al.; "Hydrogen Recovery from a H2-H2O-HBr Mixture Utilizing Silica-Based Membranes at Elevated Temperatures. 1. Preparation of H2O-and H2-Selective Membranes"; Ind. Eng. chem.. Res.; May 1998; 37, 2502-2508.

Fotou, G.P., et al.;" Hydrothermal Stability of Pure and Modified Microporous Silica Membranes"; Journal of Materials Science; 1995; 39, 2803-2808; Chapman & Hall; USA.

Yan, Shengehun, et al.; "Hydrogen-Permselective SiO2 Membrane Formed in Pores of Alumina Support tube by chemical Vapor Deposition with Tetraethyl Orthosilicate"; Materials and Interfaces; Ind. Eng. Chem. Res.; 1994; 33, 2096-2101.

Hekkink, H.A., et al.;"Characterization and Permeation Properties of Binary SiO2-TiO2 and SiO2-A | 203 Modified Gamma-Alumina Membranes"; Key Engineering Materials; 1991; vols. 61 & 62, 375-387; Copyright Trans Tech Publications, Switzerland.

Okubo, Tatsuya, et al.;"Introduction of Specific Gas Selectivity to Porous Glass Membranes by Treatment With Tetraethoxysilane"; Journal of Membrane Science; 1989; 109-117; Elsevier Science Publishers B.V., Amsterdam, The Netherlands.

Gavalas, G.R., et al.; "Deposition of H2-Permselective SiO2 Films"; Chemical Engineering and Science; 1989; vol. 44, No. 9, 1829-1835; Great Britain.

Masaryk, Joseph S., et al.;"Diffusivity of Helium in Fused Silica"; The Journal of chemical Physics; Aug. 1973; vol. 59, No. 3; 1198-1202; USA.

HYDROTHERMALLY-STABLE SILICA-BASED COMPOSITE MEMBRANES FOR HYDROGEN SEPARATION

CROSS-REFERENCE TO RELATED APPLICATIONS

This application is a continuation application of U.S. application Ser. No. 11/381,088, filed on May 1, 2006, which is hereby incorporated by reference in its entirety.

STATEMENT REGARDING FEDERALLY SPONSORED RESEARCH OR DEVELOPMENT

Not applicable.

TECHNICAL FIELD OF THE INVENTION

The present invention relates to composite membranes applicable for the separation of gases. The composite membrane comprises an overcoat of a silica-based composite placed on optional porous substrates deposited on a porous support. The invention also includes methods for preparing such composite membranes. The composite membrane can be used for the selective separation of hydrogen from other gases, and is particularly advantageous for use in humid environments.

BACKGROUND OF THE INVENTION

Membranes may be defined as thin, solid materials that permit the selective transport of certain chemical species over others.

Silica membranes prepared by chemical vapor deposition (CVD) or sol-gel methods on mesoporous supports are effective for selective hydrogen permeation [T. Okubo and H. Inoue, J. Membr. Sci., 42 (1989) 109; G. R Gavalas, et al., Chem. Eng. Sci., 44 (1989) 1829; S. Yan et al., Ind. Eng. Chem. Res., 33 (1994) 2096]. However, it is known that hydrogen-selective silica materials are not hydrothermally stable. Most researchers have reported a loss of permeability of silica membranes (as much as 95% or greater in the first 12 h) on exposure to moisture at high temperature. Sea et al. found that the hydrogen permeance of a silica membrane deposited on mesoporous γ-alumina substrates was decreased by 90% from $3.5 \times 10^{-7}$ to $4.0 \times 10^{-8}$ mol m$^{-2}$s$^{-1}$Pa$^{-1}$ after exposure to 50 mol % water vapor at 400° C. for 100 h [Sea et al. Ind. Eng. Chem. Res. 37 (1998) 2502]. Wu et al. reported a decrease of 62% and 70% in the permeances of He and $N_2$ for a CVD-deposited silica membrane treated at 600° C. under a $N_2$ flow containing 20 mol % water vapor [Wu et al., J. Membr. Sci., 96 (1994) 257]. This is because the porous silica ($SiO_2$) easily undergoes densification upon exposure to water vapor at elevated temperatures. The densification involves the formation of Si—O—Si bonds from silanol groups (Si—OH) catalyzed by water, leading to the shrinkage of pores (Iler, The Chemistry of Silica, Wiley, New York, 1979).

Much effort has been expended on the improvement of the stability of silica membranes. One approach is to make hydrophobic silica membranes prepared by the incorporation of methyl groups in the silica microstructure [de Vos et al., J. Membr. Sci., 158 (1999) 277].], [Y. S. Lin, I. Kumakiri, B. N. Nair, H. Alsyouri, "Microporous Inorganic Membranes", Separ. Purif. Methods, 2002, 31, 229-379].

On the other hand, composite membranes prepared by sol-gel methods composed of silica with other inorganic oxides such as alumina ($Al_2O_3$), titania ($TiO_2$) and zirconia ($ZrO_2$) have been reported as better alternatives to silica membranes for use under humid atmospheres at high temperature. Fotou et al. [Fotou et al., J. Mater. Sci., 30 (1995) 2803] introduced these oxides and MgO into the membranes by doping the starting silica sol with controlled amounts of the corresponding nitrate salts. They found that the mean pore size did not change much from 0.6 nm to 0.7 nm, but the hydrothermal stability was improved after doping with 3% alumina. A heat treatment in 50 mol % steam/air at 600° C. for 30 h resulted in 63.6% reduction in the surface area and a loss of 86.5% micropore volume for the unsupported 3% alumina-doped silica membrane, compared to 84.6% and 94.5%, respectively for a pure silica membrane. They also reported that 6% alumina-doped and magnesia-doped silica membranes were not improved, since the surface area was substantially reduced compared with the pure silica. The membranes prepared by Fotou et al. differ from our membranes because they consist of layers of sol particles without a continuous top layer deposited by CVD. As such they have spaces in between the particles that give rise to poor selectivity. The authors do not report permeance or selectivity, however, these properties have been measured for similar membranes. The permeation properties of such membranes prepared by the sol-gel deposition of $SiO_2$-10 mol % $Al_2O_3$ and $SiO_2$-10 mol % $TiO_2$ compositions on a gamma-alumina support were reported by Hekkink et al. [Hekkink et al., Key Eng. Mater., 61&62 (1991) 375]. The $H_2$ permeances at 298 K were $7 \times 10^{-7}$, $2.2 \times 10^{-7}$ and $6 \times 10^{-8}$ mol m$^{-2}$s$^{-1}$ Pa$^{-1}$ for pure $SiO_2$, $SiO_2$-10 mol % $TiO_2$ and $SiO_2$-10 mol % $Al_2O_3$ membranes, respectively. The $SiO_2$—$Al_2O_3$ derived membrane had permeance for $H_2$ of $2.5 \times 10^{-7}$ mol m$^{-2}$s$^{-1}$Pa$^{-1}$ at 301 K and the $SiO_2$—$TiO_2$ derived membrane had permeance for $H_2$ of $6.7 \times 10^{-7}$ mol m$^{-2}$s$^{-1}$Pa$^{-1}$ at 473 K. These permeances are high, but the selectivities over CO were only 3 and 9. This is indicative of the presence of channels that permit passage of all gases, and is typical for membranes prepared by the sol-gel method. Selectivity can be increased, but only at the cost of reducing permeance, as discussed below.

As another example of work on sol-gel membranes, Yoshida et al. investigated the hydrothermal stability of sol-gel derived silica-zirconia membranes with a content of zirconia of 10-50 mol % [Yoshida et al., J. Chem. Eng. Japan, 34 (2001) 523]. After a 20 h-exposure to a high temperature of 773 K and steam at levels of 13-33 mol %, a $SiO_2$-10 mol % $ZrO_2$ membrane still suffered a decrease of $H_2$ permeance of 70% to $8.9 \times 10^{-8}$ mol m$^{-2}$s$^{-1}$Pa$^{-1}$, but with an increased selectivity of $H_2$ to $N_2$ of 190, while the $SiO_2$-50 mol % $ZrO_2$ membrane did not show any change in the $H_2$ permeance but a constant $H_2/N_2$ selectivity of 4.0. It is well known in the membrane field that selectivity can be increased with a drop in permeance, and this represents a typical example of this phenomenon.

The composite membranes prepared by the chemical vapor deposition method generally have a better selectivity but a lower permeance in comparison to those obtained with the sol-gel procedure. Nam et al. made $SiO_2$—$TiO_2$ membranes at 873 K on porous Vycor glass with a mean pore diameter of 4 nm by hydrolysis of tetraisopropyl titanate (TIPT) and tetraethyl orthosilicate (TEOS) at atmospheric pressure [Nam et al., Korean Membr. J., 3 (2001) 69]. Using molar ratios of TIPT/TEOS in the range of 0.1-7, composite membranes were obtained that showed high selectivities of around 500 but with low permeance of $2 \times 10^{-8}$ mol m$^{-2}$s$^{-1}$Pa$^{-1}$ at 873 K. This again is an example of the tradeoff between selectivity and permeance that gives rise to high selectivity at the cost of low permeance.

To obtain ceramic membranes with both high selectivity and permeance, some researchers have used mesoporous or macroporous supports with pore diameters larger than 50 nm to decrease the resistance of the supports. By using an intermediate mesoporous gamma-alumina layer, Yan et al. and placing the silica in the pores of the support by CVD they obtained a $H_2$ permeance of $1.8 \times 10^{-1}$ mol $m^{-2}s^{-1}Pa^{-1}$ but a selectivity of $H_2$ to $N_2$ of only 26 at 873 K [Yan et al. Ind. Eng. Chem. Res., 33 (1994) 2096]. The poor selectivity was due to the presence of defects due to the use of an intermediate layer of large particle size, which left large openings between the particles. Oyama et al. made membranes with the silica layer on the outer surface of an alumina substrate and obtained permeability of $2.2 \times 10^{-7}$ mol $m^{-2}s^{-1}Pa^{-1}$ and a selectivity of $H_2$ to CO of 370 at 873 K [S. T. Oyama, L. Zhang, D. Lee, D. S. Jack, "Hydrogen Selective Silica-Based Membranes" U.S. Pat. No. 6,854,602 B2, Feb. 15, 2005]. Recently, we have successfully prepared a gamma-alumina multilayer with a graded structure by sequentially placing boehmite sols of gradually decreasing particle sizes on a macroporous alumina support Oyama et al. [S. T. Oyama, Y. Gu, D. Lee, U.S. patent application Ser. No. 10/775,288, Feb. 10, 2004,]. The multilayer graded structure had a thickness of tens of nanometers and was substantially defect-free. After deposition of a thin silica layer by the CVD technique method described in a patent [Hydrogen-Selective Silica Based Membrane, S. T. Oyama, A. Prabhu, U.S. Pat. No. 6,527,833, Mar. 4, 2003], the resulting silica-on-alumina membranes had excellent permeability of $3.0 \times 10^{-7}$ mol $m^{-2}s^{-1}$ $Pa^{-1}$ and good selectivity for hydrogen over $CH_4$, CO and $CO_2$ of over 500 at 873 K.

SUMMARY OF THE INVENTION

This invention relates to composite silica-based membranes for the separation of hydrogen and other gases which are stable to high temperature in moist or humid environments The invention comprises mixed-element membranes composed of silica and another element or elements deposited on an optional porous substrate by chemical vapor deposition of gaseous precursors. The porous alumina substrate is in turn placed on top of a support, which may be any porous material. The purpose of the substrate is to provide a more uniform surface oil which to place the mixed-element composition.

According to preferred embodiments of this invention, $SiO_2$—$Al_2O_3$ and $SiO_2$—$TiO_2$ composite membranes are prepared on graded and nongraded mesoporous gamma-alumina intermediate layers supported on macroporous alpha-alumina tubes by employing a dual-element CVD technique at high temperature. In some embodiments, the dual-element CVD technique at high temperature utilizes opposing reactant flows.

BRIEF DESCRIPTION OF THE DRAWINGS

For a better understanding of the present embodiments, reference is made to the accompanying drawings, in which.

DETAILED DESCRIPTION OF THE PREFERRED EMBODIMENTS

Figure 1:
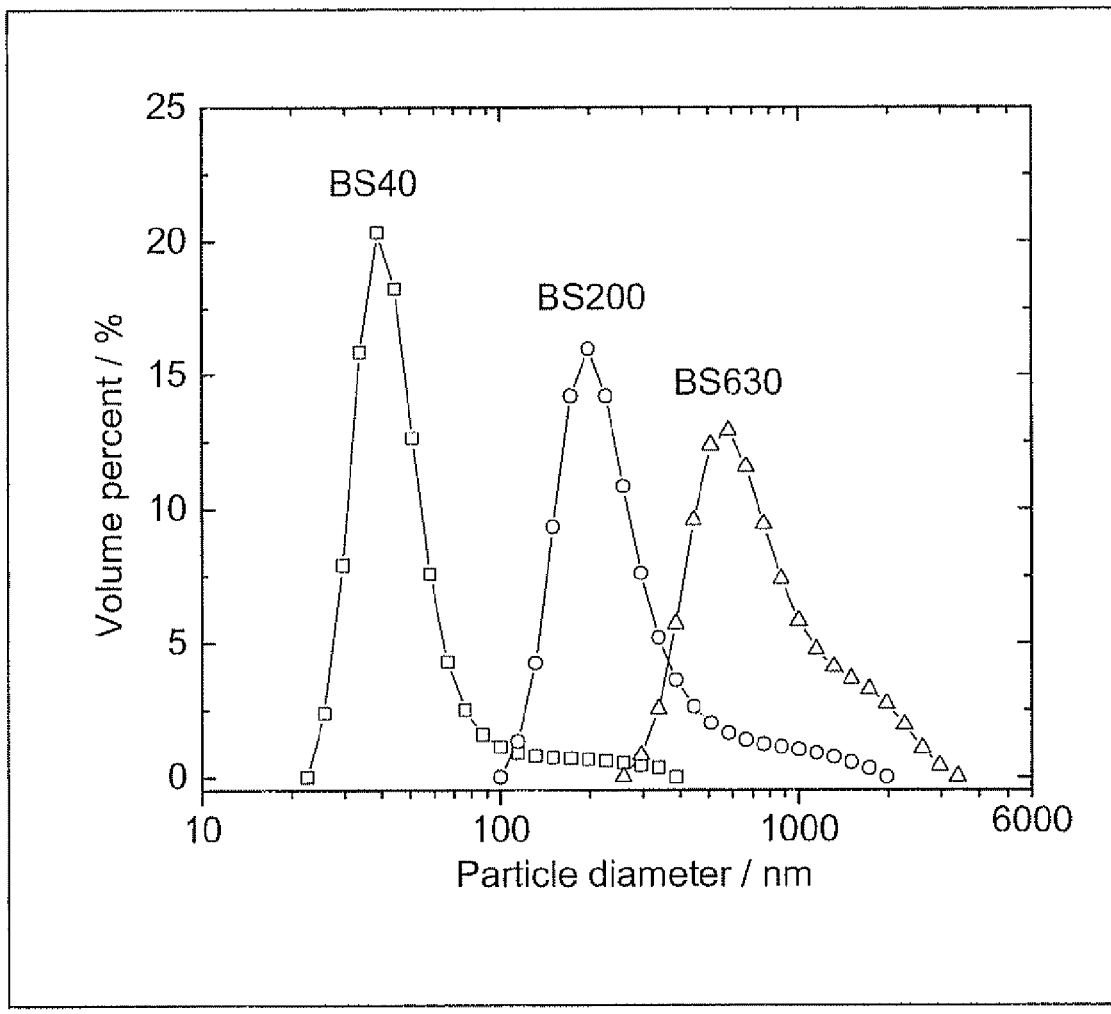
FIG. 1 is a plot showing particle size distribution of boehmite sols labeled BS40, BS200 and BS630.

The thin and defect-free composite membranes of the present invention are formed on an optional intermediate substrate that can be a single layer or a multilayer with a gradually decreasing pore size structure placed on a macroporous support. The substrate is prepared by coating a mesoporous support with particles so as to make its external pore structure (in the surface region) more uniform. The particles can be in the nanometer to micrometer size range. A single layer of particles may be used of varying or constant size. Alternatively, multiple layers of particles of different size may be used to achieve the end of obtaining a uniform surface layer. Preferably, the layers will be composed of particles of increasingly small size. The particles are formed in any manner, but will be denoted here as sols. A sol is defined here as collection of suspended particles. The invention uses a single dilute sol dipping solution or a series of sol dipping solutions containing sols of different particle sizes. The dipping solutions are used to coat a support. Each coating step is followed by a calcination step.

There is no restriction on the support except that it be porous. Although not restricted to these, the porous support comprises a material selected from the group consisting of alumina, silica, titania, magnesia, zirconia, zeolites, carbon, phosphorus, gallium, germanium, yttria, niobia, lanthana, stainless steel and combinations thereof. These are well-known materials that can be made in porous form.

The use of an intermediate layer results in a uniform, microporous substrate on which to deposit the topmost layer. This allows the present membranes to be thin and defect-free and thus have both high selectivity and permeance. Our membranes also make use of thermal decomposition in inert gas of the silica, alumina, and titania precursors, rather than oxidative degradation. As is shown in EXAMPLE 11 below, the use of oxygen results in membranes having poor permeance.

In cases where the support is itself uniform and microporous, it should be evident to those skilled in the art that the intermediate substrate would be optional.

The sols can be of any composition as described above. An example will be given here for boehmite (AlOOH) sols. Boehmite sols with different particle sizes were prepared by carefully controlling the hydrolysis of aluminum alkoxides and the subsequent acid peptization of the resulting boehmite precipitate. The general procedure for preparing boehmite sols was as follows. A quantity of 0.2 mol of aluminum isopropoxide (Aldrich, 98+) was added to 300 ml of distilled water at room temperature. The mixture was quickly heated to 353 K within 0.5 h with high speed stirring and was maintained at this temperature for 3-24 h for the hydrolysis of the isopropoxide and the formation of a boehmite (AlOOH) precipitate. The precipitate was then heated to 365 K and was peptized using a quantity of acetic acid (GR, 99.7%) with a molar ratio of $H^+$/Alkoxide in the range of 0.04-0.15. Peptization refers to the breakup of large oxide precipitate particles by acid treatment.

The solution was refluxed at 365 K for 20 h to get a clear or slightly translucent sol. The concentration of the resulting boehmite sols was calculated from the volume of the liquid and the known quantity of isopropoxide used. A dynamic light scattering analyzer (Horiba Model LB-500) was used to measure the particle size of the boehmite sols. These sols remained stable for more than 3 months. Three boehmite sols with median particle sizes of 40, 200 and 630 nm were used in the present invention to prepare the gamma-alumina multilayer substrate. FIG. 1 shows the particle size distributions of these three boehmite sols. The sols labeled BS40, BS200 and BS630 have median particle diameters of 40 nm, 200 nm and 630 nm, respectively.

Figure 2:
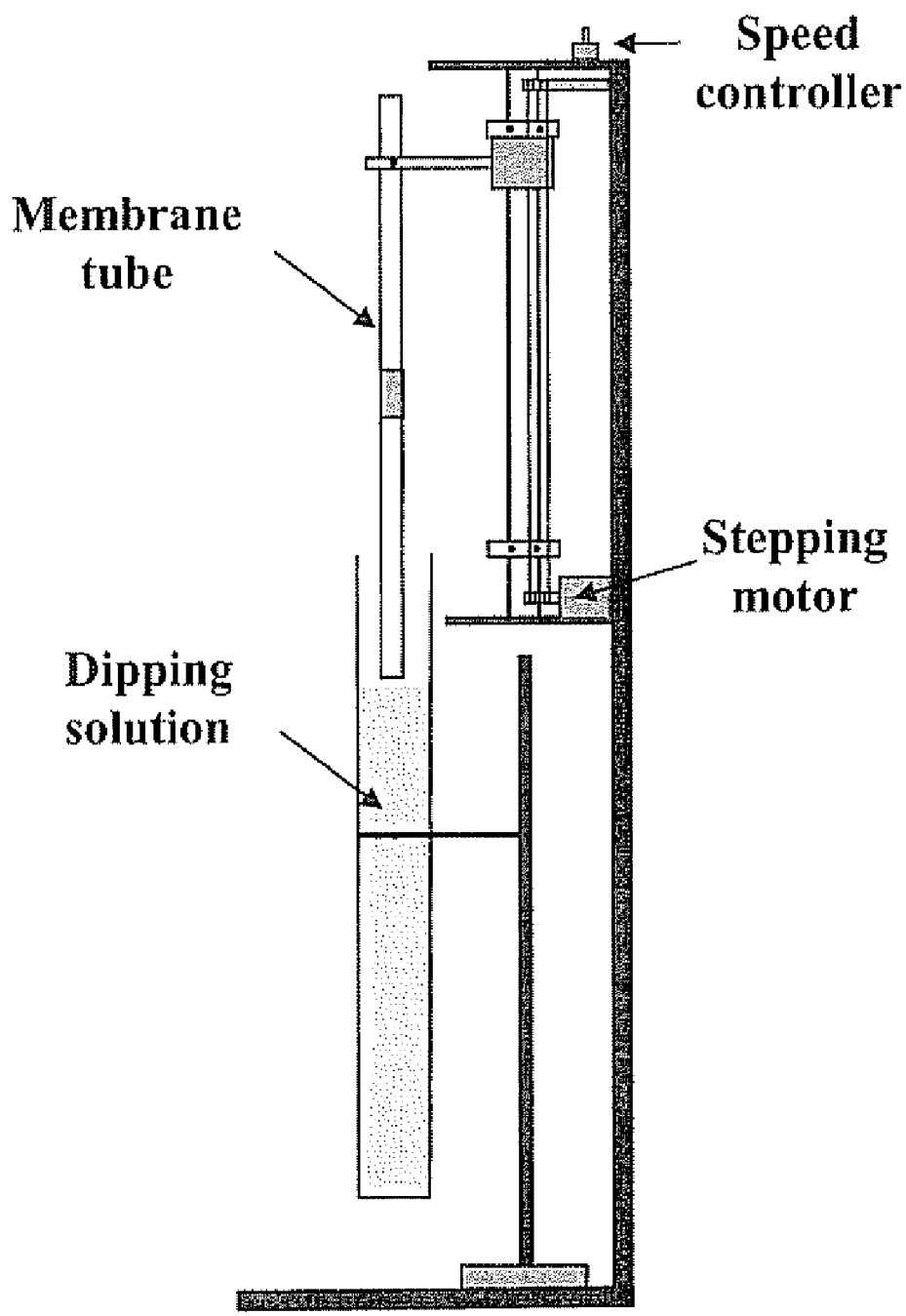
FIG. 2 is a schematic diagram of a mechanical motor-driven dip-coating machine.

A thin and defect-free gamma-alumina multilayer employed in the present invention was prepared on a macroporous alpha-alumina support by the dipping-calcining method described in patent application number PCT/US 05/03552. The dip-coating of the support was carried out with a series of dilute dipping solutions containing boehmite sols of different particle sizes. A commercial alumina membrane tube (PALL Corporation, Membralox® TI-70-25Z Membrane Tube, I.D.=7 mm, O.D.=10 mm) with a nominal pore size of 100 nm was used as the support. The preparation involved several steps. First, the alumina tube was cut to a length of 3-4 cm with a diamond saw and was connected to non-porous alumina tubes at both ends with ceramic joints The ceramic joints were made with a glaze (Duncan IN 1001) fired at 1153 K for 0.5 h. Second, dilute dipping solutions were prepared by mixing the boehmite sols with a polyvinyl alcohol (PVA, M.W.=72,000) solution and diluting with distilled water to obtain a 0.15 M concentration of the sol and a 0.35 wt. % concentration of the PVA. Third, the alumina support was dipped into the dipping solution and was withdrawn after 10 seconds at a rate of 0.01 m s$^{-1}$ to ensure uniform and reproducible coatings using a motor-driven dip-coating machine. The dip-coating machine was built in-house and used a stepping motor drive (FIG. 2) Fourth, the dip-coated alumina was dried in ambient air for 24 h, and then was heated to 923 K in air at a rate of 1 K min$^{-1}$ and calcined at 923 K for 2 h. The dipping-calcining process was successively carried out five times using different dipping solutions containing boehmite sols in the order of decreasing sol particle size: 630, 630, 200, 40 and 40 nm. (Two of the sols were applied twice.)

Figure 3:
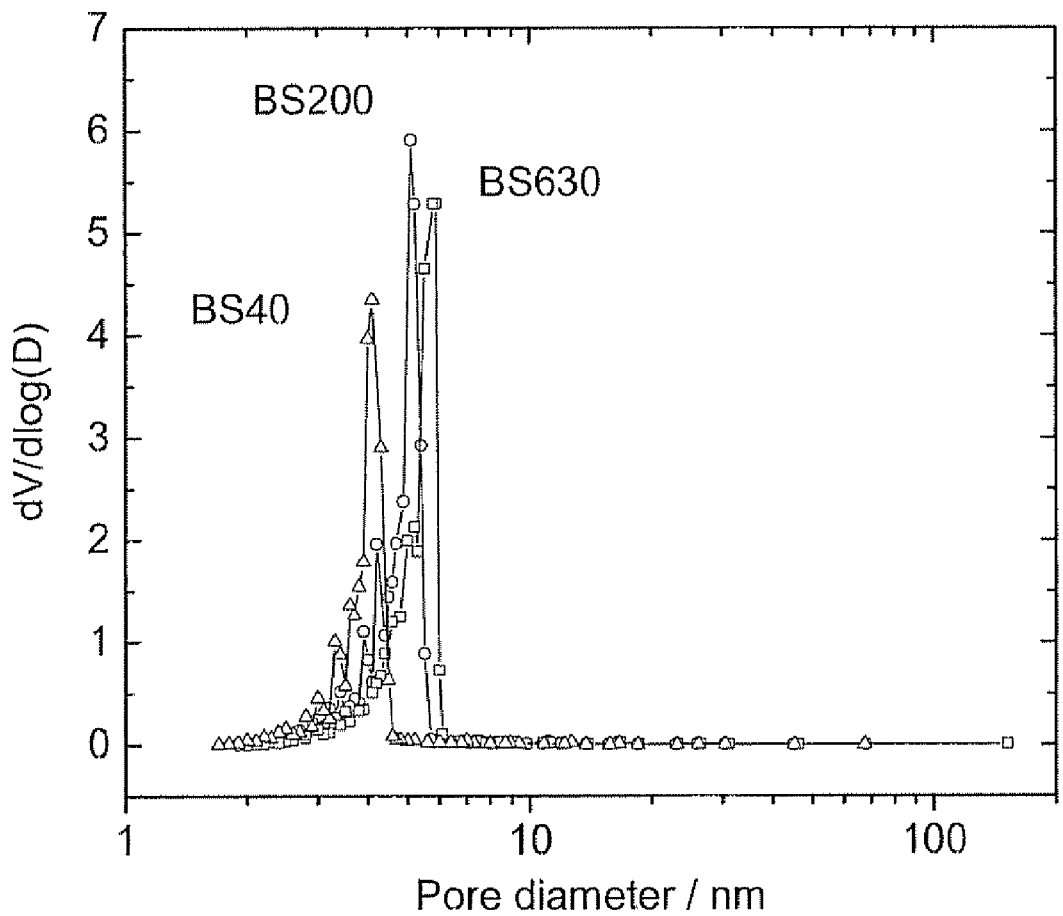
FIG. 3 is a plot showing pore size distributions of γ-alumina membranes prepared from boehmite sols BS40, BS200 and BS630.

The microstructures of the intermediate gamma-alumina membranes were characterized by nitrogen physisorption conducted in a volumetric unit (Micromeritics ASAP 2000). The samples were prepared using the same procedure and parameters as the supported membranes. First, a boehmite sol was cast on a glass Petri dish and dried at ambient temperature in air. The dried gel flakes were recovered from the bottom of the Petri dish, and were then heated to 923 K in air at a rate of 1 K min$^{-1}$) and maintained at this temperature for 2 h. The Barrett, Joyner and Halenda (BJH) method was used to determine the pore size distribution using the desorption isotherm. FIG. 3 illustrates the pore size distributions of the gamma-alumina substrates prepared from the boehmite sols containing particles of size of 630, 200, and 40 nm. These substrates had a sharp pore size distribution. Table 1 lists the microstructure parameters of these three substrates. It was found that the larger the particle of sols, the larger the pore size and porosity of the resulting membranes as discussed in connection with FIG. 1.

TABLE 1

Microstructure Parameters of Gamma-Alumina Membranes Calcined at 923 K for 2 h

| | Gamma-alumina membrane (calcined at 923 K for 2 h) | | | |
|---|---|---|---|---|
| Sol particle size (nm) | Pore volume ($cm^3 g^{-1}$) | Pore surface area ($m^3 g^{-1}$) | Average pore size (nm) | Porosity* (%) |
| 630 | 0.4731 | 370.4 | 5.11 | 63.6 |
| 200 | 0.4321 | 378.7 | 4.56 | 61.5 |
| 40 | 0.3622 | 388.6 | 3.73 | 57.3 |

*$\rho_{gamma-alumina}$ = 3.7 g $cm^{-3}$ (R. S. A. de Lange et al., J. Membr. Sci., 99 (1995) 57)

Figure 4:
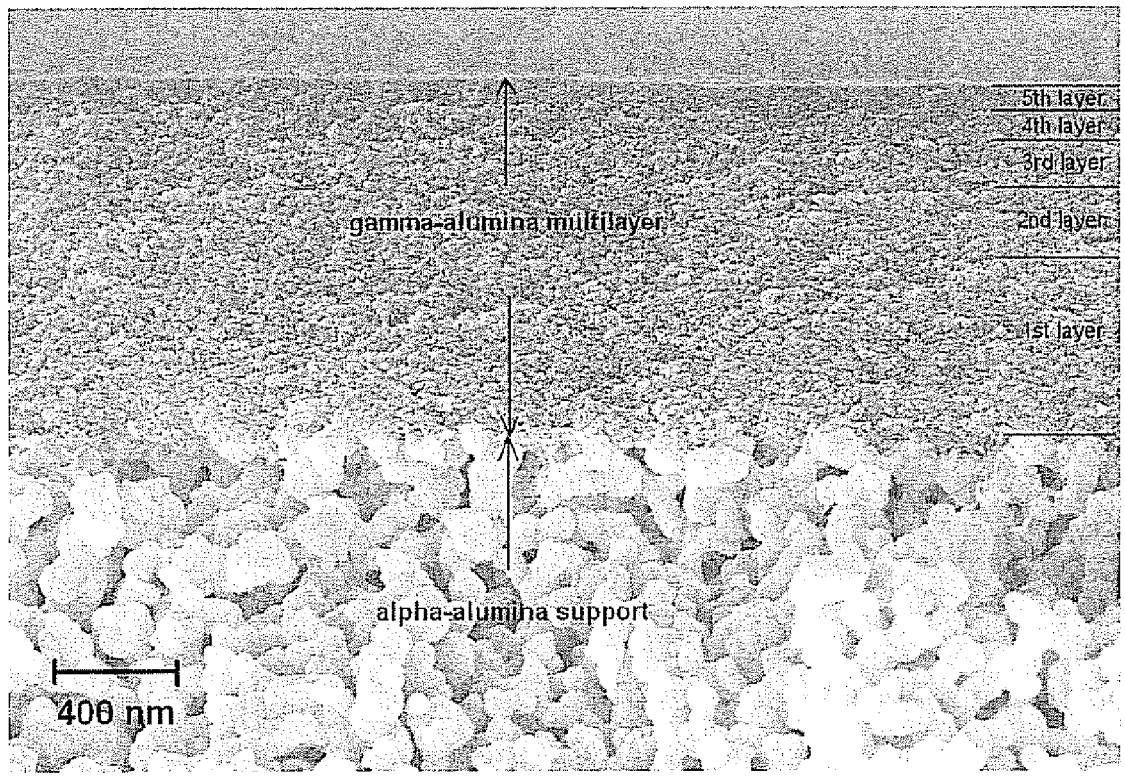
FIG. 4 is a micrograph showing a cross-sectional image of a gamma-alumina multilayer substrate formed on a macroporous alumina tube.

The cross-sectional microstructure of the gamma-alumina multilayer substrate was characterized using a Field Emission Scanning Electron Microscope (FESEM, Leo 1550). The samples were coated by sputtering with a layer of gold before measurement with the electron microscope The thicknesses of the γ-alumina substrate were obtained from cross-sectional photos with high resolution. FIG. 4 shows a cross-sectional image of the 5-layer graded γ-alumina membrane substrate.

The composite membranes of the present invention were prepared using the previously described gamma-alumina multilayer substrates by the deposition of a thin multicomponent layer by the chemical vapor deposition (CVD) method. This process places a multicomponent layer on the surface of the substrate by thermal decomposition at high temperature. One of the components is silica in the form of tetraethylortlhosilicate (TEOS). The silica source is not restricted to TEOS. It can be any volatile compound of silica. Although not limited to these, it can be tetramethylorthosilicate (TMOS), ethyltriethoxysilane, silane, chlorosilane, and combinations thereof. The other components are not restricted. Examples are presented for alumina and titania and theoretical calculations are presented for other elements. The aluminum compound used was aluminum-tri-sec-butoxide (ATSB) but the alumina source is not restricted to ATSB. Although not limited to these, it can be aluminum tributoxide, aluminum tri-tert-butoxide, aluminum triethoxide, aluminum chloride, and combinations thereof. The titanium compound used was titanium isopropoxide (TIP) but the titania source is not restricted to TIP. Although not limited to these, it can be other titanium alkoxides, titanium alkyls, titanium chloride, and combinations thereof. It should be clear to those skilled in the art that alumina and titania are not the only materials that can be combined with silica. Other oxides that can be employed are those of B, Al, P, Ga, Ge, As, In, Sn, Sb, Sc, Ti, V, Y, Zr, Nb, La, Hf, and Ta, that can form bonds with silica. Similarly, it should be clear to those skilled in the art that the combinations are not restricted to binary combinations, and that multiple component combinations are possible.

Figure 5:
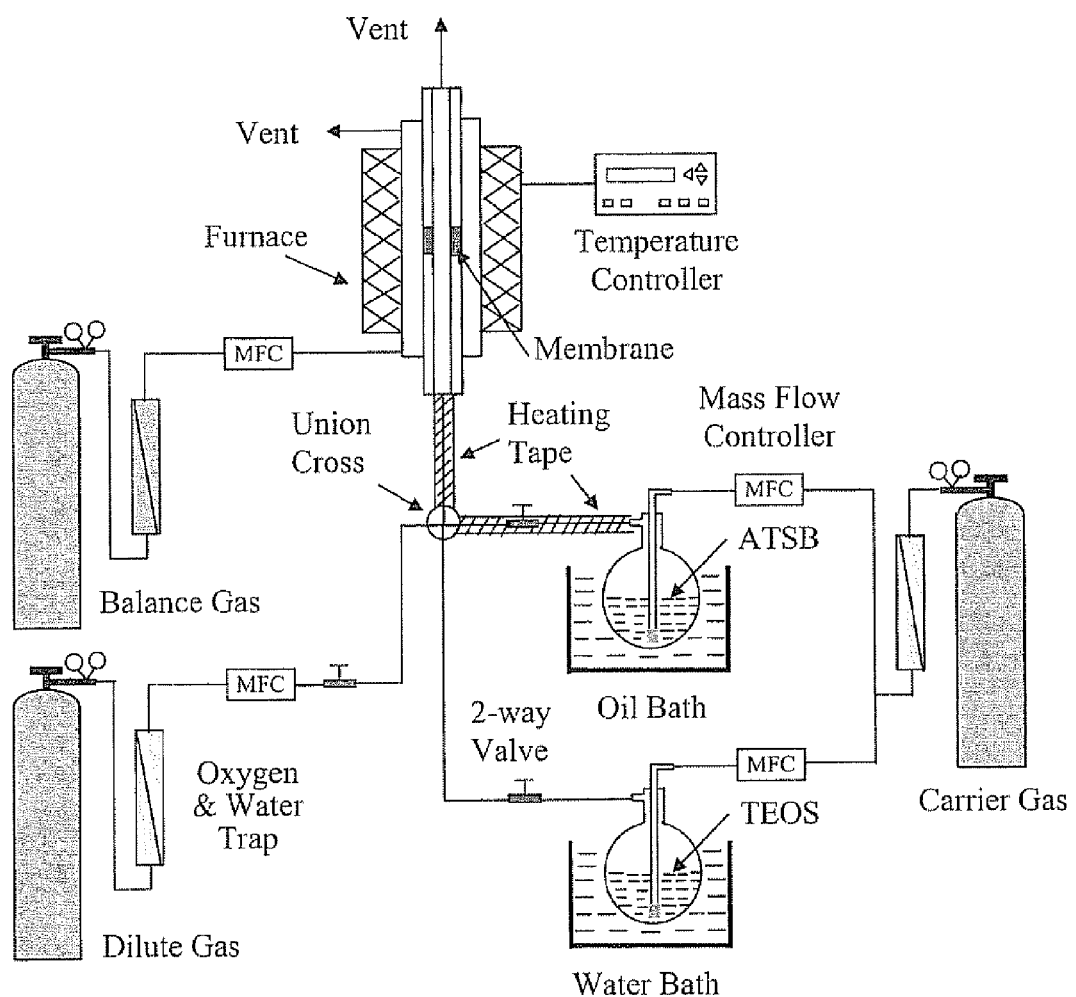
FIG. 5 is a schematic diagram of a dual-element CVD apparatus used in the deposition of the silica-alumina composite layer.

The CVD setup is shown in FIG. 5, and the CVD process parameters are listed in Table 2. A specific example is cited for a silica-alumina composite. The process parameters are not restricted to those listed. It should be clear to those skilled in the art that the parameters can vary over a broad range. The range can also be affected by the scale of the synthesis, the speed of the desired transformation, the geometry of the components, the particular apparatus used, and the expense of the reagents, and other considerations. The CVD) conditions themselves are also not restricted to 873 K and atmospheric pressure. It should be clear to those skilled in the art that the temperature can range from 298 to 1273 K and the pressure from subatmospheric to 30 atm.

The support covered with the gamma-alumina layers was installed concentrically inside a piece of quartz tubing of 14 mm inside diameter using machined Swagelok fittings with Teflon ferrules. After placing the assembly in an electrical furnace and heating it to 873 K at a heating rate of 1 K $min^{-1}$, an argon gas flow was introduced on the outer shell side and a dilute argon gas flow was passed on the inner tube side. After 30 min. a TEOS carrier gas flow was passed through a bubbler filled with TEOS at 296 K and a separate ATSB carrier gas flow was passed through a bubbler filled with ATSB at a higher temperature in the range of 357-369 K. The two carrier gases were then premixed with the dilute Ar flow before introduction to the inside of the support tube. The molar ratio of ATSB to TEOS was adjusted by carefully controlling the flow rates of the carrier gases and the temperature of ATSB. The deposition time was varied from 3 to 6 h. After the CVD process was finished, the assembly was purged with the balance and dilute gas flows for 30 min. The gas permeation measurement was generally conducted at 873 K on $H_2$, $CH_4$, CO and $CO_2$ by admitting the pure gases at a certain pressure (higher than atmospheric pressure) into the inner tube side, one end of which was closed, and measuring the quantity of gas flowing from the outer tube. The selectivity was calculated as the ratio of the permeances of $H_2$ to $CH_4$, CO and $CO_2$ Permeation of He, $H_2$, and Ne was measured in a similar manner at different temperatures.

The hydrothermal stability test was carried out under an Ar flow containing 16 mol % or 57 mol % water vapor at 873 K up to 520 h. First, an Ar flow at 15 μmol $s^{-1}$ (flow rates in μmol s-1 can be convened to $cm^3$ (NTP) $min^{-1}$ by multiplication by 1.5) was passed through a heated bubbler containing distilled water and was then introduced on the inner membrane tube side to directly contact the fresh composite membranes, while another Ar flow also at 15 μmol $s^{-1}$ was maintained on the outer shell side. The $H_2$, $CH_4$ and $CO_2$ permeation rates were measured periodically during the hydrothermal stability test to monitor the changes in the permeance and selectivity. To make the measurements, water vapor was shut off for about 20 min to dry the membranes under a dry Ar flow. The wet Ar flow was resumed immediately after the permeance measurements.

TABLE 2

CVD Process Parameters for the Preparation of Silica-Alumina Membranes (CVD temperature is always 873 K)

| | Cond. I | Cond. II | Cond. III | Cond. IV | Cond. V | Cond. VI | Cond. VII |
|---|---|---|---|---|---|---|---|
| TEOS Bath Temp. (K) | 296 | 296 | 296 | 296 | 296 | 296 | 296 |
| ATSB Bath Temp. (K) | 365 | 369 | 367 | 363 | 358 | 357 | 357 |
| TEOS Carrier Gas (μmol $s^{-1}$) | 2.9 | 3.6 | 3.7 | 3.7 | 3.7 | 3.3 | 3.3 |

TABLE 2-continued

CVD Process Parameters for the Preparation of Silica-Alumina Membranes
(CVD temperature is always 873 K)

| | Cond. I | Cond. II | Cond. III | Cond. IV | Cond. V | Cond. VI | Cond. VII |
|---|---|---|---|---|---|---|---|
| ATSB Carrier Gas ($\mu$mol s$^{-1}$) | 10.3 | 5.7 | 4.1 | 4.0 | 4.2 | 4.1 | 4.1 |
| Dilute Gas ($\mu$mol s$^{-1}$) | 21.4 | 7.7 | 9.2 | 9.2 | 9.2 | 15.5 | 25.4 |
| Balance Gas ($\mu$mol s$^{-1}$) | 34.4 | 17.0 | 17.0 | 16.9 | 17.1 | 22.9 | 32.8 |
| TEOS Concen. × 10$^3$ (mol m$^{-3}$) | 7.5 | 19.2 | 19.4 | 19.4 | 19.4 | 13.0 | 9.1 |
| ATSB Concen. × 10$^3$ (mol m$^{-3}$) | 0.83 | 1.25 | 0.77 | 0.57 | 0.40 | 0.27 | 0.19 |
| ATSB/TEOS (molar) | 0.11 | 0.065 | 0.04 | 0.03 | 0.02 | 0.02 | 0.02 |

Example 1

This example describes the synthesis of boehmite sols that are used for the preparation of the gamma-alumina multilayer substrates. A boehmite sol was prepared by adding 0.2 mol of aluminum isopropoxide (Aldrich, 98+) to 300 ml of distilled water at room temperature The mixture was stirred at high speed and heated to 353 K. The alkoxide was hydrolyzed at this temperature for 3 or 24 h, and then the temperature of the mixture was raised to 365 K after which the flask was opened for 1.5 h to allow volatilization of the alcohol. The flask was then closed again and the solution was stirred at 365 K for 1 h with refluxing. Then, a quantity of acetic acid (GR, 99.7%) was added to the solution to give a 0.15, 0.07 or 0.04 of molar ratio of H$^+$/Alkoxide. After peptization at 365 K with refluxing for 20 h, a clear or slightly translucent stable sol solution was obtained. Three boehmite sols with a median particle size of 40, 200 and 630 nm denoted as BS40, BS200 and BS630, respectively were obtained by carefully controlling the synthesis parameters, as listed in Table 3. The results in Table 3 demonstrate that long hydrolysis time and low acid concentration produce larger sol particles. Due to the relatively long time of peptization, these colloid sols have a narrow particle size distribution, as shown in FIG. 1. They were found to be stable for more than three months. They were used for the preparation of the intermediate layers of the gamma-alumina membrane substrate as will be described.

TABLE 3

Synthesis Parameters of Boehmite Sols with Different Particle Size

| Sample | Hydrolysis time (h) | Molar ratio of H$^+$/Alkoxide | Average median particle size (nm) |
|---|---|---|---|
| BS40 | 3 | 0.15 | 40 |
| BS200 | 24 | 0.07 | 200 |
| BS630 | 24 | 0.04 | 630 |

Example 2

This example describes the preparation of dipping solutions which are used in the dipping-calcining procedure for placing alumina layers on top of a porous support. The dipping solutions are diluted combinations of the sol solutions described in Example 1 mixed with a binder, polyvinyl alcohol (PVA). Three dipping solutions with sol concentrations of 0.15 M were prepared. The dipping solution made using the boehmite sol BS40 with median particle size of 40 nm described in Example 1 was designated as DS40. 400 ml of the dipping solution DS40 were prepared as follows. First, 3.5 g of PVA (Fluka, M.W.=72,000) and 5 ml of 1 M HNO$_3$ were added to 95 ml of boiling water with vigorous stirring and refluxing. After 4 h, a clear solution with a PVA weight concentration of 3.5% was obtained. Then, 77 ml of 0.80 M boehmite sol BS40 were vigorously mixed with 283 ml of distilled water and 40 ml of the 3.5 wt % PVA solution were added and refluxed at 323 K for 2 h. The final concentrations of PVA and boehmite sol were 0.35 wt % and 0.15 M. The solution was cooled to room temperature at quiescent conditions for 1 h and was set aside for the preparation of the gamma-alumina membranes.

Dipping solutions DS630 and DS200 were obtained by the same procedure using the boehmite sols BS630 and BS200 with median particle sizes of 630 and 200 nm described in Example 1.

Example 3

This example describes the preparation of intermediate gamma-alumina multilayer substrates with a graded structure by the deposition of five gamma-alumina layers on top of a porous support, where the layers are formed from dipping solutions with increasingly small sol particles. The support used was a commercial alumina membrane tube with a nominal pore size of 100 nm. It was used in sections of 3-4 cm length connected with non-porous alumina tubing at both ends by ceramic joints. A dip-coating method was employed to coat the alumina supports with the sol and binder materials. First, the dipping solution DS 630 containing the boehmite sot with median particle size of 630 nm described in Example 2 was used. The support was dipped at a speed of 0.01 m s$^{-1}$ in the dipping solution DS630, was held for 10 seconds, and was withdrawn at the same speed. Use was made of the mechanical dip-coating machine shown in FIG. 2. The sol-coated tube was dried in ambient air for 24 h, heated to 923 K at a heating rate of 1 K min$^{-1}$ and calcined for 2 h. Then, the dipping-calcining procedure was repeated using the same dipping solution DS630, followed by application of the dipping-calcining procedure with solutions DS200, DS40 and DS40. As described in Example 2, the solutions DS630, DS200 and DS40 contained the sols with median particle sizes of 630, 200 and 40 nm, respectively. The pore size distribution of every layer, of this multilayer substrate is given in FIG. 3. The cross-sectional image of this multilayer substrate obtained by high resolution field emission scanning electron microscopy (FESEM) is shown in FIG. 4. The figure shows three regions of γ-alumina (corresponding to the layers formed with three solutions of different particle size) with a clear boundary formed on the top of the macroporous α-alumina support. The textures of the γ-alumina layers are different and the top layers of the figure have finer structure than the bottom layers of the figure. The total thickness of this 5-layer section is only around 1200 nm (1.22 μm). Also, FIG. 4 shows that there is a good connection between the γ-alumina multilayer and the α-alumina support and that no infiltration of sol particles (or pore clogging) occurred in the pores of the support during the dip-coating process.

Example 4

This example describes the preparation of three different silica-alumina composite membranes by the mixed chemical vapor deposition (CVD) technique of this invention. The composite membranes were deposited on the same alumina multilayer substrate described in EXAMPLE 3, but different CVD process parameters denoted Condition I, Condition II and Condition III, and listed in Table 2 were employed separately. The composite membrane SA-I was obtained by using Condition I. The silica source was TEOS (tetraethylorthosilicate) vapor and was introduced using a bubbler at 296 K with Ar as a carrier gas at a flow rate of 2.9 μmol s$^{-1}$. The alumina source was ATSB (aluminum-tri-sec-butoxide) vapor, and it was similarly introduced by means of a bubbler at 365 K using Ar as a carrier gas at a flow rate of 10.3 μmol s$^{-1}$. The TEOS and ATSB flows were combined and passed on the tube (inner) side of the tubular membrane, while a flow of Ar at a rate of 34.4 μmol s$^{-1}$ was maintained on the shell (outer) side of the reactor assembly. A dilution gas flow at a rate of 21.4 μmol s$^{-1}$ was also used so that the TEOS concentration was 7.5×10$^{-3}$ mol m$^{-3}$ and ATSB concentration was 0.83×10$^{-3}$ mol m$^{-3}$, leading to a molar ratio of ATSB/TEOS of 0.11. The dual-element CVD process was conducted for 3 h and 6 h with the apparatus shown in FIG. 5, The permeation properties at 873 K before and after CVD are listed in Table 4. The selectivities of H$_2$ over CH$_4$ and CO$_2$ for the membrane support with the intermediate gamma-alumina multilayer are close to the values predicated by the Knudsen diffusion mechanism. After 3 h and 6 h of CVD, the permeance declined slightly but the selectivities did not improve much. The H$_2$ permeance was high, 2.6×10$^{-6}$ mol m$^{-2}$s$^{-1}$Pa$^{-1}$ at 873 K.

The same procedure was followed to deposit a layer of silica-alumina using the CVD process Condition II and Condition III. After adjusting the flow rates of the ATSB carrier gas and the dilution gas, the TEOS concentrations were kept at around 19×10$^{-3}$ mol m$^{-3}$ while the ATSB concentrations were 1.25×10$^{-3}$ and 0.77×10$^{-3}$ mol m$^{-3}$, giving rise to molar ratios of ATSB/TEOS of 0.065 and 0.04 for Condition II and Condition III, respectively. The resulting composite membranes were designated composite membranes SA-II and SA-III, respectively. The permeation properties at 873 K are also listed in Table 4.

The composite membranes prepared with the molar ratio of ATSB/TEOS in the range of 0.04-0.11 had relatively high permeability but low selectivity.

TABLE 4

Gas Permeation Properties of Silica-Alumina Composite Membranes Before and After Dual-Element CVD at 873 K

| Permeation properties | | Multilayer substrate | SA-I 3 h-CVD | SA-I 6 h-CVD | SA-II 3 h-CVD | SA-III 3 h-CVD | SA-III 6 h-CVD |
|---|---|---|---|---|---|---|---|
| Permeance (mol · m$^{-2}$s$^{-1}$Pa$^{-1}$) | H$_2$ | 4.5 × 10$^{-5}$ | 6.0 × 10$^{-6}$ | 2.6 × 10$^{-6}$ | 2.8 × 10$^{-7}$ | 1.4 × 10$^{-6}$ | 4.2 × 10$^{-7}$ |
| | CH$_4$ | 1.6 × 10$^{-5}$ | 2.1 × 10$^{-6}$ | 6.3 × 10$^{-7}$ | 1.7 × 10$^{-8}$ | 2.3 × 10$^{-7}$ | 3.8 × 10$^{-8}$ |
| | CO$_2$ | 1.0 × 10$^{-5}$ | 1.3 × 10$^{-6}$ | 2.8 × 10$^{-7}$ | 9.2 × 10$^{-9}$ | 1.7 × 10$^{-7}$ | 2.3 × 10$^{-8}$ |
| Selectivity | H$_2$/CH$_4$ | 2.8 | 2.8 | 4.1 | 16 | 6.1 | 11 |
| | H$_2$/CO$_2$ | 4.5 | 4.6 | 9.3 | 30 | 8.3 | 18 |

Example 5

Figure 6:
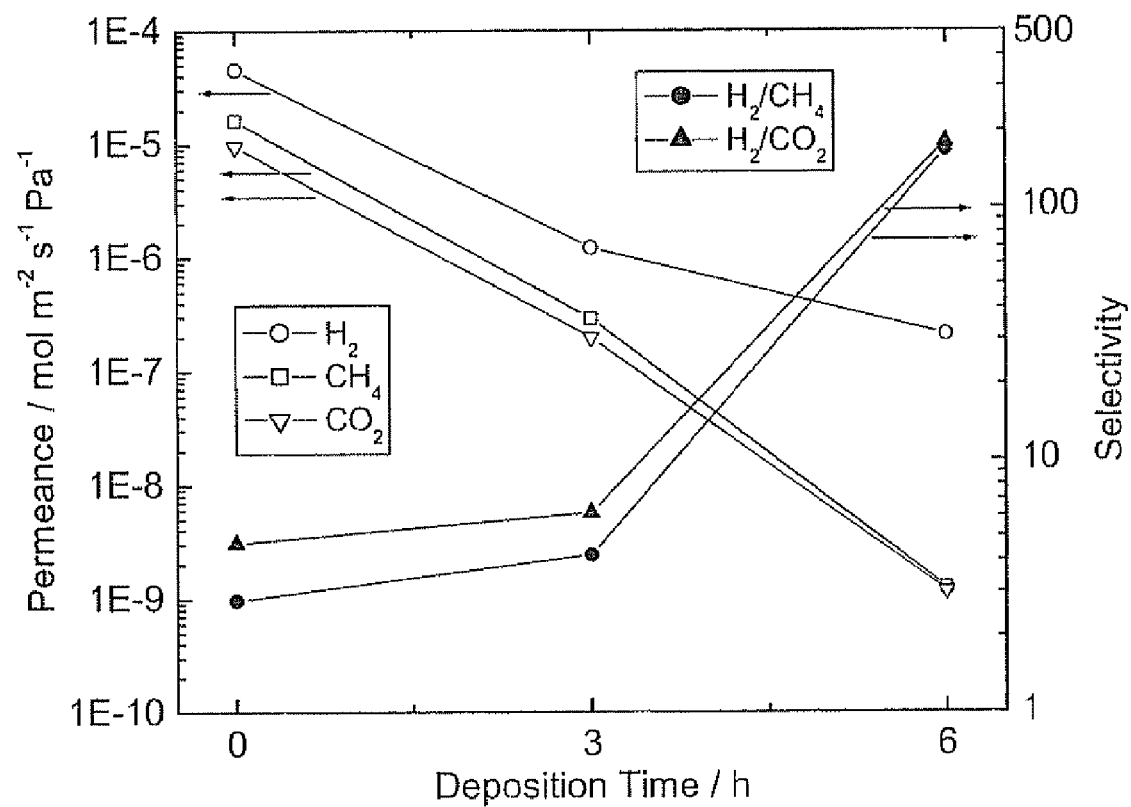
FIG. 6 is a plot showing permeation properties at 873 K of a silica-alumina composite membrane prepared with a ratio of ATSB/TEOS=003 and a TEOS concentration of $19.4 \times 10^{-3}$ mol $m^{-3}$.

This example describes another silica-alumina composite membrane deposited on the gamma-alumina multilayer substrate described in EXAMPLE 3. Condition IV was used in this case and the resulting composite membrane was designated SA-IV. Compared with the cases in EXAMPLE 4, a lower molar ratio of ATSB/TEOS (0.03) was used in this example. TEOS was introduced through a bubbler at 296 K using Ar as a carrier gas at 3.7 μmol s$^{-1}$ on the inner side of the tubular membrane, and ATSB through a bubbler at 363 K using Ar as a carrier gas at 4.0 μmol s$^{-1}$, while a flow of Ar of 16.9 μmol s$^{-1}$ was maintained on the shell side of the reactor assembly. A dilution gas at a rate of 9.2 μmol s$^{-1}$ was added so that the TEOS concentration was 19.4×10$^{-3}$ mol m$^{-3}$ and the ATSB concentration was 0.57×10$^{-3}$ mol m$^{-3}$, leading to a molar ratio of ATSB/TEOS of 0.03. The dual-element CVD process was conducted for 3 h and 6 h. FIG. 6 and Table 5 show the changes of permeation properties at 873 K before and after CVD. The membrane had a Si—Al CVD layer deposited on a gamma-alumina multilayer placed on top of a macroporous alumina support. CVD preparation condition IV was used with molar ratio of ATSB/TEOS of 0.03 and TEOS concentration of 0.0194 mol m$^{-3}$. The selectivities increased quickly with the deposition time. After 6 h of deposition, the selectivities of H$_2$ over CH$_4$ and CO$_2$ were 170, and 180, respectively at 873 K with the H$_2$ permeance of 2.1×10$^{-7}$ mol m$^{-2}$s$^{-1}$Pa$^{-1}$, which was better than that in Example 4.

TABLE 5

Gas Permeation Properties of a Silica-Alumina Composite Membrane Before and After Dual-Element CVD at 873 K

| Permeation properties | | Multilayer substrate | SA-IV 3 h-CVD | SA-IV 6 h-CVD |
|---|---|---|---|---|
| Permeance (mol m$^{-2}$s$^{-1}$Pa$^{-1}$) | H$_2$ | 4.5 × 10$^{-5}$ | 1.2 × 10$^{-6}$ | 2.1 × 10$^{-7}$ |
| | CH$_4$ | 1.6 × 10$^{-5}$ | 2.9 × 10$^{-7}$ | 1.2 × 10$^{-9}$ |
| | CO$_2$ | 9.6 × 10$^{-6}$ | 2.0 × 10$^{-7}$ | 1.2 × 10$^{-9}$ |

TABLE 5-continued

Gas Permeation Properties of a Silica-Alumina Composite
Membrane Before and After Dual-Element CVD at 873 K

| Permeation properties | | Multilayer substrate | SA-IV | |
|---|---|---|---|---|
| | | | 3 h-CVD | 6 h-CVD |
| Selectivity | $H_2/CH_4$ | 2.8 | 4.2 | 170 |
| | $H_2/CO_2$ | 4.7 | 6.2 | 180 |

Example 6

Figure 7:
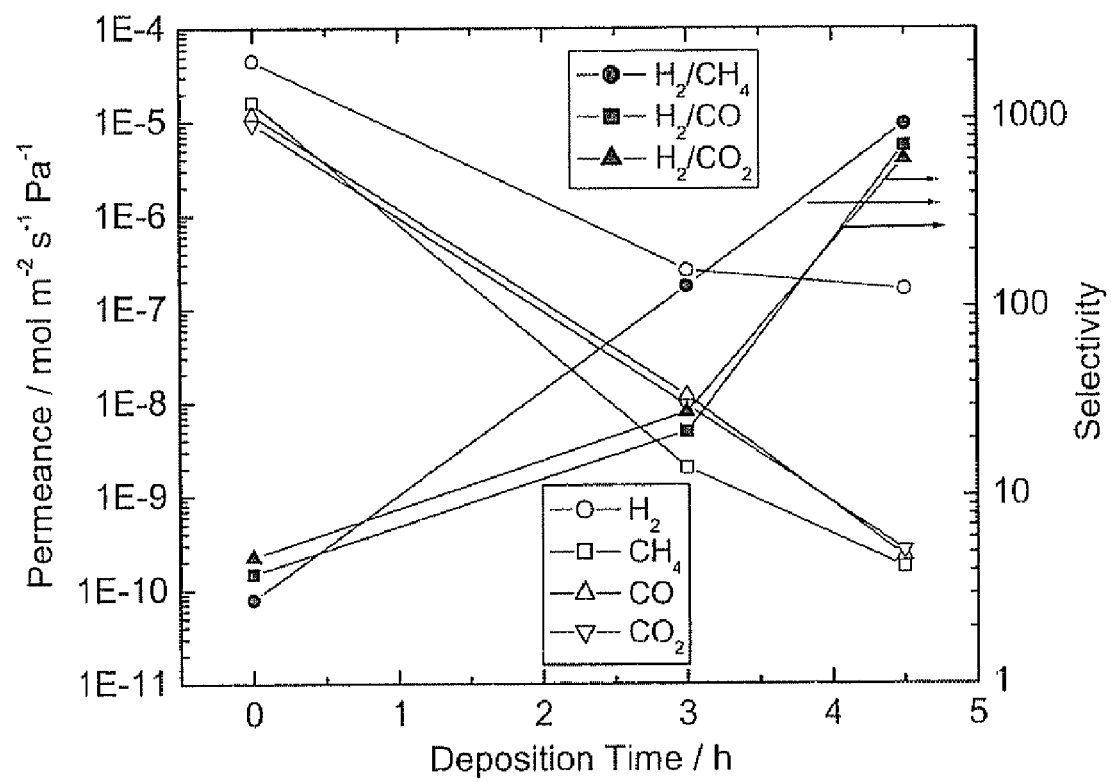
FIG. 7 is a plot showing permeation properties at 873 K of a silica-alumina composite membrane prepared with a ratio of ATSB/TEOS=0.02 and a TEOS concentration of $19.4 \times 10^{-3}$ mol $m^{-3}$.
Figure 8:
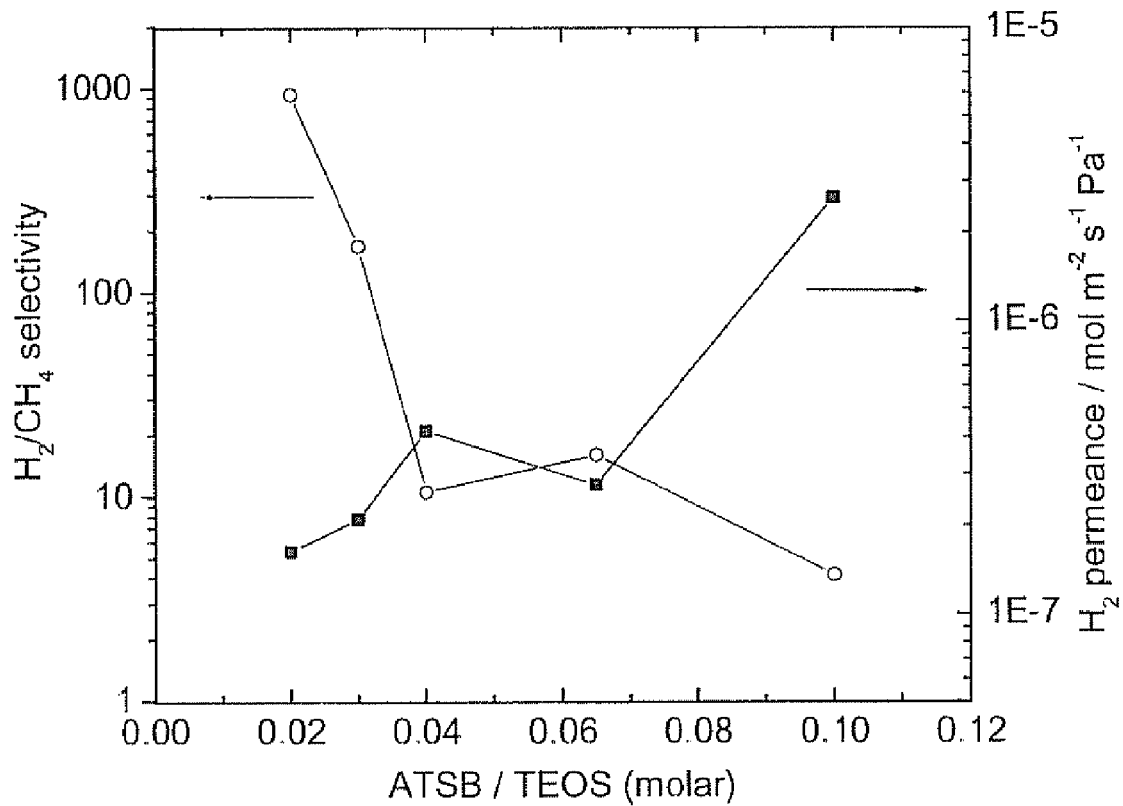
FIG. 8 is a plot showing $H_2$/$CH_4$ selectivity and $H_2$ permeance at 873 K of the composite membranes prepared with different molar ratios of ATSB/TEOS.

This example describes another silica-alumina composite membrane deposited using CVD Condition V on the gamma-alumina multilayer substrate described in EXAMPLE 3. The same TEOS concentration of $19.4 \times 10^{-3}$ mol m$^{-3}$ was used as in EXAMPLE 5, but a lower molar ratio of ATSB/TEOS of 0.02 was employed. TEOS was introduced through a bubbler at 296 K using Ar as a carrier gas at 3.7 μmol s$^{-1}$ Ion the inner side of the tubular membrane, and ATSB was introduced through a bubbler at a temperature of 358 K (lower than in Example 5) using Ar as a carrier gas at 4.2 μmol s$^{-1}$, while a flow of Ar at 17.1 μmol s$^{-1}$ was maintained on the shell side of the reactor assembly. A dilution gas at a rate of 9.2 μmol s$^{-1}$ was used so that the ATSB concentration was decreased to $0.40 \times 10^{-3}$ mol m$^{-3}$ while the TEOS concentration was still $19.4 \times 10^{-3}$ mol m$^{-3}$, thus giving rise to a lower molar ratio of ATSB/TEOS of 0.02. The CVD process was conducted for 3 h and 4.5 h. The resulting composite membrane was designated SA-V. FIG. 7 and Table 6 show the changes of permeation properties at 873 K before and after CVD. The selectivities increased quickly after the deposition. The membrane had a Si—Al CVD layer deposited on a gamma-alumina multilayer placed on top of a macroporous alumina support. CVD preparation condition V was used with molar ratio of ATSB/TEOS of 0.02 and TEOS concentration of 0.0194 mol m$^{-3}$. After 4.5 h of deposition, the selectivities of $H_2$ over $CH_4$, CO and $CO_2$ were 940, 700 and 590, respectively at 873 K while the $H_2$ permeance was $1.6 \times 10^{-7}$ mol m$^{-2}$s$^{-1}$Pa$^{-1}$, which was better than those in Examples 4 and 5. FIG. 8 illustrates the permeation properties of the composite membranes at 873 K prepared using different molar ratios of ATSB/TEOS.

TABLE 6

Gas Permeation Properties of a Silica-Alumina Composite Membrane
Before and After Dual-Element CVD at 873 K

| Permeation properties | | Multilayer substrate | SA-V | |
|---|---|---|---|---|
| | | | 3 h-CVD | 4.5 h-CVD |
| Permeance | $H_2$ | $4.5 \times 10^{-5}$ | $2.6 \times 10^{-7}$ | $1.6 \times 10^{-7}$ |
| (mol m$^{-2}$s$^{-1}$Pa$^{-1}$) | $CH_4$ | $1.6 \times 10^{-5}$ | $2.0 \times 10^{-9}$ | $1.7 \times 10^{-10}$ |
| | CO | $1.2 \times 10^{-5}$ | $1.2 \times 10^{-8}$ | $2.3 \times 10^{-10}$ |
| | $CO_2$ | $9.6 \times 10^{-6}$ | $9.5 \times 10^{-9}$ | $2.7 \times 10^{-10}$ |
| Selectivity | $H_2/CH_4$ | 2.8 | 130 | 940 |
| | $H_2/CO$ | 3.8 | 22 | 700 |
| | $H_2/CO_2$ | 4.7 | 27 | 590 |

Example 7

Figure 9:
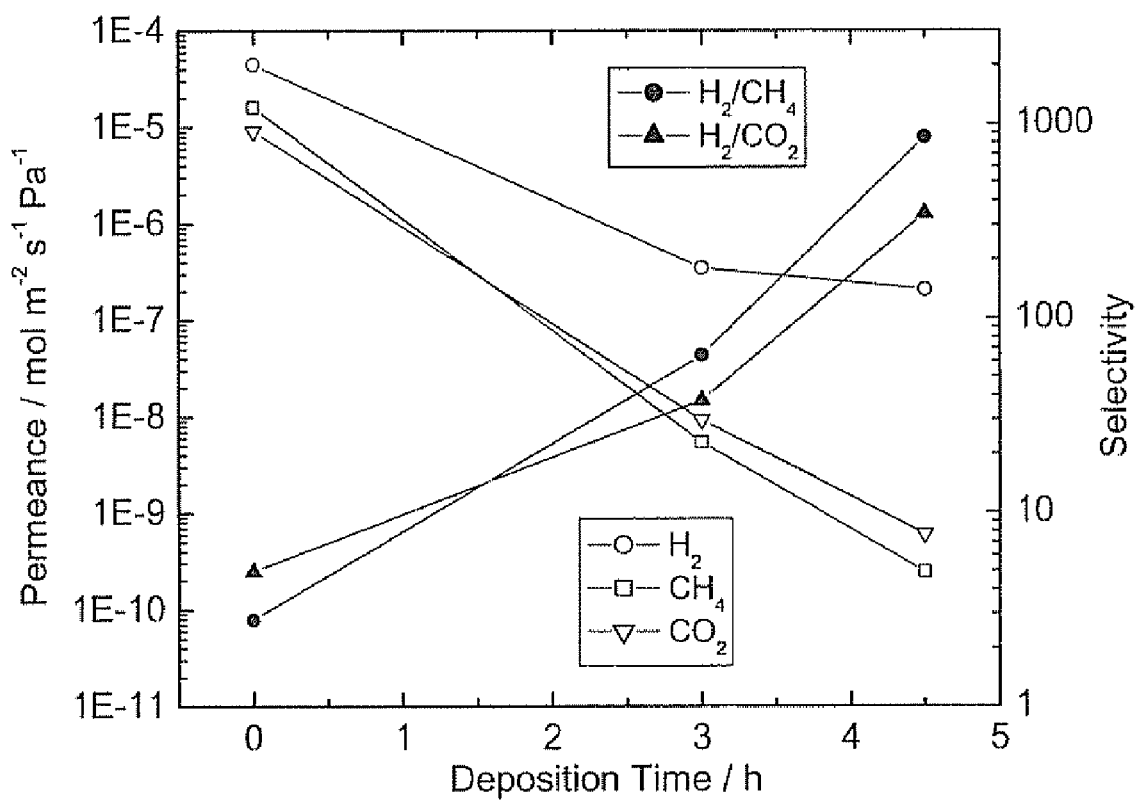
FIG. 9 is a plot showing permeation properties at 873 K of a silica-alumina composite membrane prepared with a ratio of ATSB/TEOS=0.02 and a TEOS concentration of $13 \times 10^{-3}$ mol $m^{-3}$.

This example describes another silica-alumina composite membrane formed on the gamma-alumina multilayer substrate described in EXAMPLE 3. CVD Condition VI was used and the resulting composite membrane was designated SA-VI. In this example, the molar ratio of ATSB/TEOS was kept at 0.02, the same as in EXAMPLE 6, but a lower TEOS concentration ($13.0 \times 10^{-3}$ mol m$^{-3}$) was used. TEOS was introduced through a bubbler at 296 K using Ar as a carrier gas at 3.3 mmol s$^{-1}$ on the inner side of the tubular membrane, and ATSB through a bubbler at a temperature of 357 K using Ar as a carrier gas at 4.1 μmol s$^{-1}$, while a flow of Ar at 22.9 μmol s$^{-1}$ was maintained on the shell side of the reactor assembly. A dilution gas at a rate of 15.5 μmol s$^{-1}$ was used so that the TEOS concentration was decreased to $13.0 \times 10^{-3}$ mol m$^{-3}$ while the ATSB/TEOS was still 0.02. The CVD process was conducted for 3 h and 4.5 h. FIG. 9 and Table 7 show the changes of permeation properties at 873 K before and after CVD. The membrane had a Si—Al CVD layer deposited on a gamma-alumina multilayer placed on a macroporous alumina support. CVD preparation condition VI was used with molar ratio of ATSB/TEOS of 0.02 and TEOS Concentration of 0.0130 mol m$^{-3}$. The selectivities increased quickly with the deposition time. After 4.5 h of deposition, the selectivities of $H_2$ over $CH_4$ and $CO_2$ were 940 and 590, respectively, at 873 K, while the $H_2$ permeance was $1.6 \times 10^{-7}$ mol m$^{-2}$s$^{-1Pa-1}$.

TABLE 7

Gas Permeation Properties of a Silica-Alumina Composite Membrane
Before and After Dual-Element CVD at 873 K

| Permeation properties | | Multilayer substrate | SA-VI | |
|---|---|---|---|---|
| | | | 3 h-CVD | 4.5 h-CVD |
| Permeance | $H_2$ | $4.5 \times 10^{-5}$ | $3.5 \times 10^{-7}$ | $2.1 \times 10^{-7}$ |
| (mol m$^{-2}$s$^{-1}$Pa$^{-1}$) | $CH_4$ | $1.6 \times 10^{-5}$ | $5.4 \times 10^{-9}$ | $2.4 \times 10^{-10}$ |
| | $CO_2$ | $9.6 \times 10^{-6}$ | $9.3 \times 10^{-9}$ | $6.1 \times 10^{-10}$ |
| Selectivity | $H_2/CH_4$ | 2.8 | 65 | 870 |
| | $H_2/CO_2$ | 4.7 | 38 | 340 |

Example 8

This example describes another silica-alumina composite membrane formed oil the gamma-alumina multilayer substrate described in EXAMPLE 3. CVD Condition VII was used and the resulting composite membrane was designated SA-VII. In this example, the molar ratio of ATSB/TEOS was kept at 0.02, the same as in EXAMPLES 6 and 7, but a lower TEOS concentration ($9.1 \times 10^{-3}$ mol m$^{-3}$) was used. In this example the dilute gas flow rate was increased to 25.4 μmol s$^{-1}$ so that the TEOS concentration was decreased to $9.1 \times 10^{-3}$ mol m$^{-3}$ while the ATSB/TEOS was still kept at 0.02. The CVD process was conducted for 3 h and 6 h. The permeation properties at 873 K before and after CVD are listed in Table 8. The low TEOS and ATSB concentrations employed in this case resulted in a slow increase in the selectivity, indicating that a longer deposition time is required for the preparation of a selective composite membrane in comparison to the cases using higher TEOS and ATSB concentrations such as in EXAMPLES 6 and 7.

TABLE 8

Gas Permeation Properties of a Silica-Alumina Composite Membrane Before and After Dual-Element CVD at 873 K

| | | | SA-VII | |
|---|---|---|---|---|
| Permeation properties | | Multilayer substrate | 3 h-CVD | 6 h-CVD |
| Permeance | $H_2$ | $4.5 \times 10^{-5}$ | $2.5 \times 10^{-6}$ | $4.2 \times 10^{-7}$ |
| ($mol\, m^{-2} s^{-1} Pa^{-1}$) | $CH_4$ | $1.6 \times 10^{-5}$ | $7.6 \times 10^{-7}$ | $2.4 \times 10^{-8}$ |
| | $CO_2$ | $9.6 \times 10^{-6}$ | $3.8 \times 10^{-7}$ | $1.6 \times 10^{-8}$ |
| Selectivity | $H_2/CH_4$ | 2.8 | 3.3 | 18 |
| | $H_2/CO_2$ | 4.7 | 6.6 | 26 |

Example 9

This example describes the preparation of a silica-alumina composite membrane using a nongraded intermediate layer on top of a commercial mesoporous alumina membrane tube as the support. The support purchased from PALL Corporation (Membralox® TI-70-25G Membrane Tube, I.D.=7 mm, O.D.=10 mm) had a nominal pore size of 5 nm. It was cut into a length of 3-4 cm and then connected with non-porous alumina tubing at both ends by ceramic joints. Before CVD, the top surface of the support was modified with a thin layer of gamma-alumina membrane by the dip-calcining procedure using the dipping solution DS40 CVD Condition V was used for the preparation. The CVD process was conducted for 3 h and the permeation properties at 873 K before and after CVD are listed in Table 9. Compared with the composite membrane deposited on graded alumina multilayer substrate (EXAMPLE 6), this membrane showed lower permeance and selectivity although the same CVD condition was used

TABLE 9

Gas Permeation Properties of Silica-Alumina Composite Membranes Employing a Commercial Mesoporous Alumina Support Before and After Dual-Element CVD at 873 K

| Permeation properties | | Commercial support (5-nm pore size) | 3 h-$SiO_2$—$Al_2O_3$ |
|---|---|---|---|
| Permeance | $H_2$ | $3.3 \times 10^{-5}$ | $1.0 \times 10^{-7}$ |
| ($mol\, m^{-2} s^{-1} Pa^{-1}$) | $CH_4$ | $1.3 \times 10^{-5}$ | $3.4 \times 10^{-10}$ |
| | $CO_2$ | $7.3 \times 10^{-6}$ | $6.0 \times 10^{-10}$ |
| Selectivity | $H_2/CH_4$ | 2.6 | 430 |
| | $H_2/CO_2$ | 4.5 | 170 |

Example 10

Figure 10:
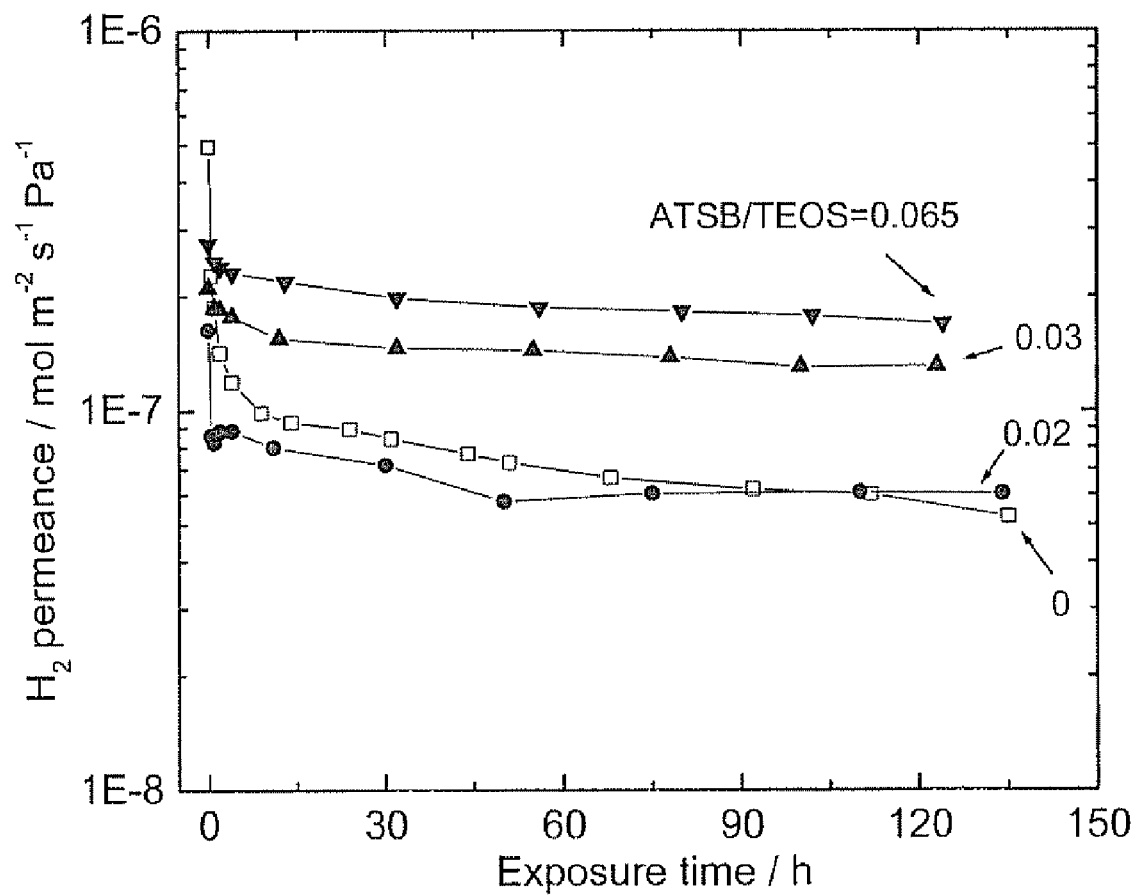
FIG. 10 is a plot showing changes in $H_2$ permeance of pure silica and composite silica-alumina membranes prepared using different molar ratios of ATSB/TEOS.

This example describes the hydrothermal stability of the silica-alumina composite membranes. For comparison a pure silica membrane was prepared at 873 K on the same graded gamma-alumina multilayer substrate by using the CVD of TEOS with the TEOS concentration of $19.3 \times 10^{-3}\, mol\, m^{-3}$ as described in our U.S. patent application Ser. No. 10/775,288, filed Feb. 10, 2004. The stability test procedure was conducted at 873 K by exposure of the freshly prepared membranes to an environment consisting of 16 mol % water and 84 mmol % argon gas or 57 mol % water and 43 mmol % argon gas for 130-520 h. First, an Ar flow at a rate of 15 µmol $s^{-1}$ was passed through a bubbler filled with water at 329 K or 358 K to produce a wet Ar gas flow containing 16 mol % or 57 mol % water vapor. Then the wet gas flow was introduced on the tube side (inner, membrane side) through a stainless steel tube, which was heated by a heating tape. In the meantime, another Ar flow (15 µmol $s^{-1}$) was maintained on the outer shell side (support side). The $H_2$, $CH_4$ and $CO_2$ permeation properties were measured periodically during the test. Before taking permeability measurements, the water vapor was shut off for about 20 min to dry the membranes under a dry Ar flow, The wet Ar flow was resumed immediately after the permeance measurement. FIG. 10 shows the change in $H_2$ permeance of the pure silica and composite silica-alumina membranes prepared using different molar ratios of ATSB/TEOS during the exposure to 16 mol % water vapor at 873 K for 130 h. It was found that although all the membranes suffered a lowering of their permeance during the first 10 h, the composite membranes clearly showed a strong resistance to the water vapor compared to the pure silica membrane. After 50 h of exposure to water vapor, the $H_2$ permeance of the composite membranes stabilized, while the permeance through the silica membrane still kept declining.

Figure 11:
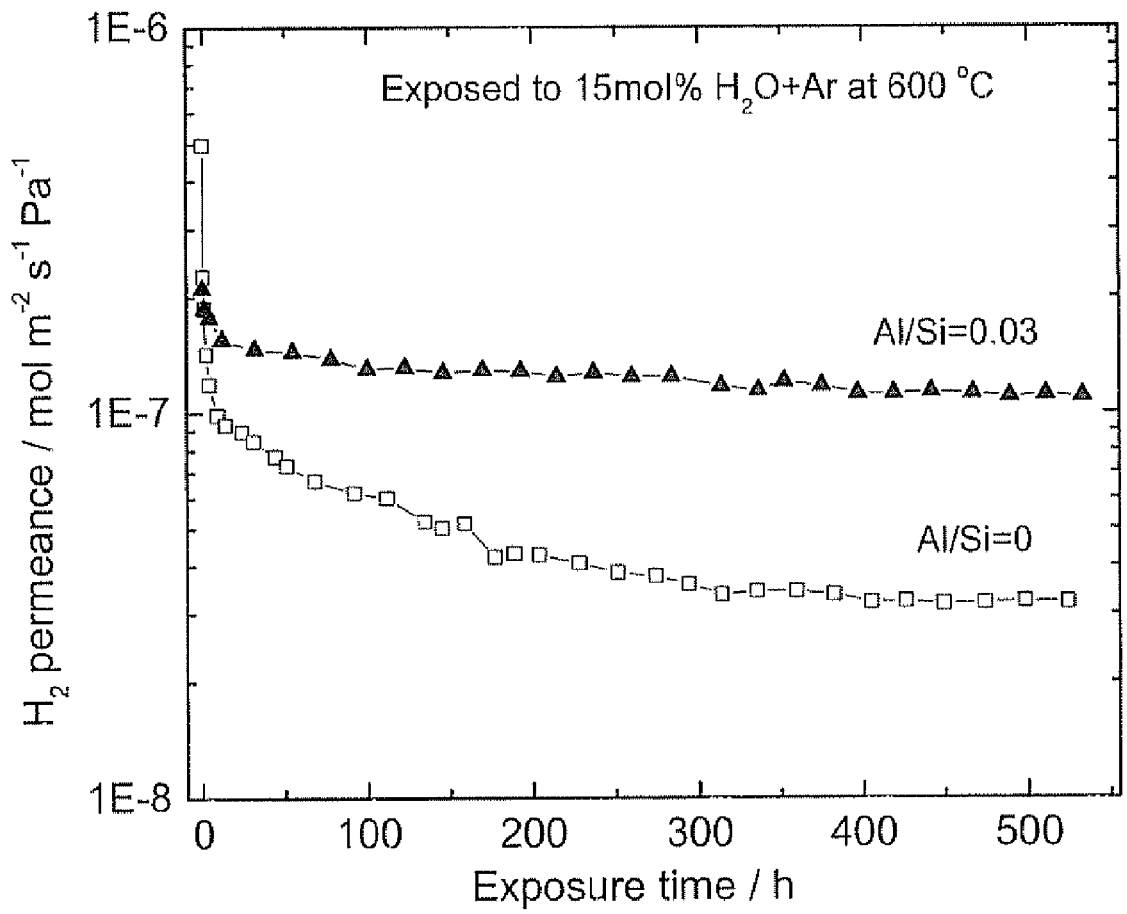
FIG. 11 is a plot comparing the long-term hydrothermal stability of the pure silica membrane and the composite membrane SA-IV obtained using CVD Condition IV with a molar ratio of ATSB/TEOS of 0.03.

On the other hand, it is clear that with increasing molar ratio of ATSB/TEOS, the resulting composite membranes showed better hydrothermal stability. FIG. 11 compares the long-term hydrothermal stability between the pure silica membrane and the composite membrane SA-IV obtained under the CVD Condition IV with the molar ratio of ATSB/TEOS of 0.03. After exposure to 16 mol % water vapor at 873 K for 520 h, the $H_2$ permeance of the composite membrane SA-IV was decreased by 48%, much less than the 94% for the pure silica membrane. The membrane SA-IV was further exposed to a higher humidity environment containing 57 mol % water vapor at 873 K for another 135 h and the decrease in 1.12 permeance was found to be less than 5%. After exposure to water vapor at high temperature, however, the permeances of the other gases ($CH_4$ and $CO_2$) through the composite membranes changed only little, thus leading to the reduction of the $H_2$ selectivities, as listed in Table 10. This likely occurred because such gases, with molecular size larger than 0.3 nm, pass through the membrane through defects and the structure of these defects did not change much during exposure to the humid atmosphere

TABLE 10

Change in the Selectivities of $H_2$ over $CH_4$ and $CO_2$ through the Composite Membranes during the Exposure to 16 mol % $H_2O$—Ar at 873 K

| | Before exposure | | 30 h-exposure | | 130 h-exposure | |
|---|---|---|---|---|---|---|
| Membrane | $H_2/CH_4$ | $H_2/CO_2$ | $H_2/CH_4$ | $H_2/CO_2$ | $H_2/CH_4$ | $H_2/CO_2$ |
| SA-II | 16 | 30 | 12 | 20 | 8.3 | 14 |
| SA-IV | 170 | 180 | 47 | 66 | 40 | 68 |
| SA-V | 940 | 590 | 270 | 260 | 130 | 300 |

Example 11

This comparative example describes another silica-alumina composite membrane deposited using CVD Condition IV on the gamma-alumina substrate described in EXAMPLE 9, except that air was used as the dilution gas. A molar ratio of ATSB/TEOS of 0.03 was used for this example. The membrane was denoted as SA-IV-$O_2$. The dual-element CVD process was conducted for 3 h. Table 11 compares the permeation properties at 873 K of the membrane with a membrane prepared at the identical conditions but with argon as the dilution gas. It is clear that the use of oxygen severely deteriorates the permeation properties of the membrane. This indicates that the method of Nam, et al. [Korean Membr. J. 3 (2001) 69] is not applicable for making membranes at our conditions.

TABLE 11

Gas Permeation Properties of Silica-Alumina Composite Membranes Employing a Commercial Mesoporous Alumina Support Before and After Dual-Element CVD at 873 K

| Permeation properties | | Multilayer substrate | SA-IV 3 h-CVD | SA-IV-O$_2$* 3 h-CVD |
|---|---|---|---|---|
| Permeance (mol m$^{-2}$s$^{-1}$Pa$^{-1}$) | H$_2$ | 4.5 × 10$^{-5}$ | 1.2 × 10$^{-6}$ | 2.8 × 10$^{-8}$ |
| | CH$_4$ | 1.6 × 10$^{-5}$ | 2.9 × 10$^{-7}$ | 1.2 × 10$^{-10}$ |
| | CO$_2$ | 9.6 × 10$^{-6}$ | 2.0 × 10$^{-7}$ | <8.0 × 10$^{-11}$ |

*Air used as dilution gas instead of Argon

Example 12

This example illustrates the unique permeability properties of the silica-alumina composite membrane of this invention. A composite membrane deposited on the gamma-alumina multilayer substrate was prepared using Condition VI as described in EXAMPLE 7. The permeability of the membrane for He, H$_2$, and Ne was measured and the results are presented in FIG. 12. The permeability rises with temperature as expected. The same unusual order of permeability of He>H$_2$>Ne was found as in the pure silica membrane described in our U.S. patent application Ser. No. 10/775,288, filed Feb. 10, 2004. Although the present invention is not intended to be limited by any theory or mechanism, the order and behavior of the species can be explained by a mechanism originally suggested to describe permeation in vitreous glasses (J. S. Masamyk, R. M. Fulrath, *J Chem. Phys.* 1973, 59, 1198.), involving jumps between solubility sites rather than diffusion through pores. The governing equation is:

$$Q = \frac{1}{6L}\left(\frac{d^2}{h}\right)\left(\frac{h^2}{2\pi mkT}\right)^{\frac{3}{2}}\left(\frac{\sigma h^2}{8\pi^2 IkT}\right)^{02}\frac{(N_S/N_A)}{(e^{hv'/2kT}-e^{-hv'/2kT})^2}e^{-\Delta E_K/RT}$$

Figure 12:
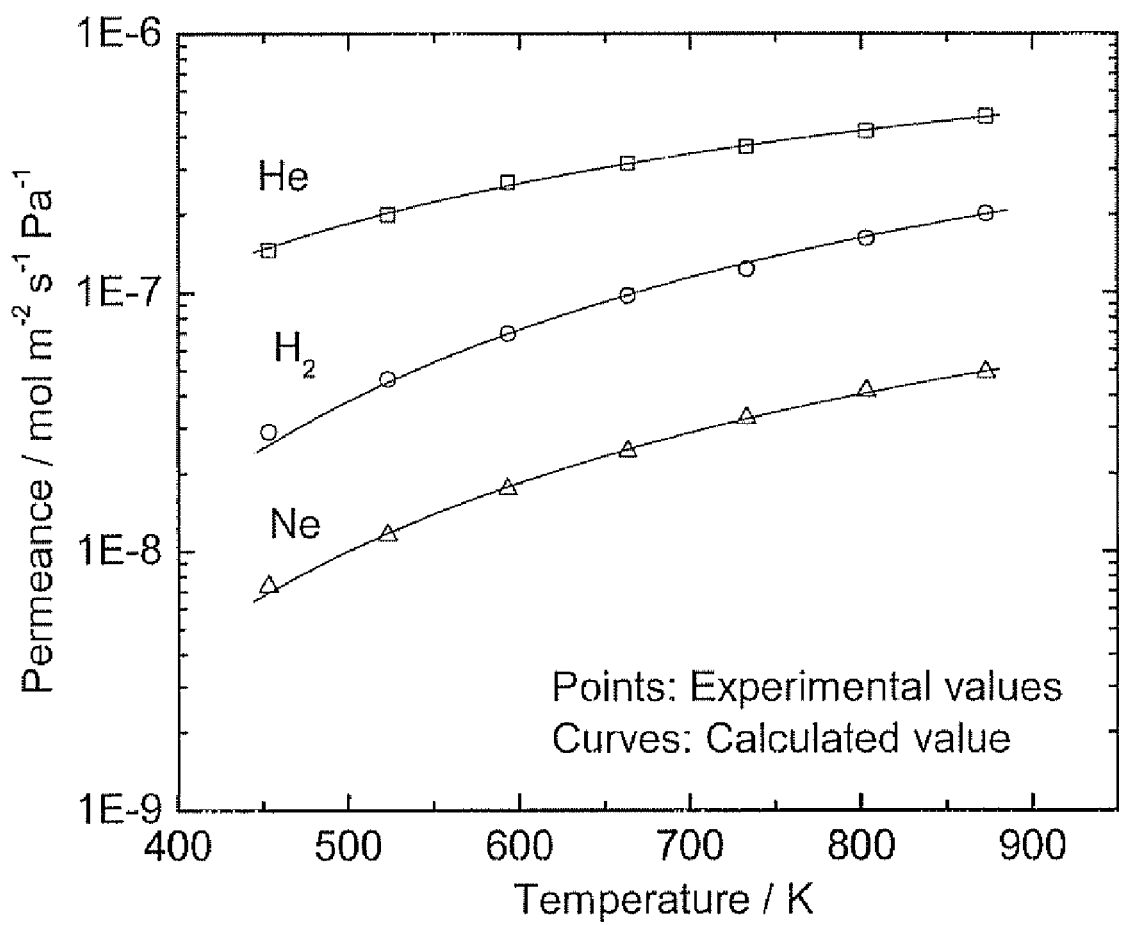
FIG. 12 is a plot showing the permeability of He, $H_2$, and Ne through a silica-alumina membrane deposited on a gamma-alumina multilayer substrate by using a dual-element CVD technique using Condition VI.

In the equation Q=permeability, L=membrane thickness, d=jump distance, h=Planck's constant, m=mass of permeating species, k=Boltzmann constant, T=absolute temperature, N$_s$=number of solubility sites, N$_A$=Avogadro's number, v=jump frequency, $\Delta E_K$=activation energy, R=gas constant. This permeance model can be applied to hydrogen in a similar form taking into account partial loss of rotational freedom at the doorway sites through a factor $$\left(\frac{\sigma h^2}{8\pi IkT}\right)^{02},$$

where σ is the symmetry factor (2) for H$_2$ and I is its moment of inertia. The calculated curves, assuming a jump distance of 0.8 ml, fit the experimental points very well (FIG. 12). The calculated parameters are summarized in the following Table 12.

TABLE 12

Calculated Parameters for Silica-Alumina Composite Membrane

| Gases | Kinetic Diameter (nm) | Weight (atomic units) | N$_s$ (sites m$^{-3}$) | v* (s$^{-1}$) | E$_a$ (kJ mol$^{-1}$) |
|---|---|---|---|---|---|
| He | 0.26 | 4 | 8.00 × 10$^{26}$ | 9.00 × 10$^{12}$ | 6.10 |
| H$_2$ | 0.289 | 2 | 6.47 × 10$^{26}$ | 1.02 × 10$^{13}$ | 14.1 |
| Ne | 0.275 | 20 | 6.90 × 10$^{26}$ | 4.92 × 10$^{12}$ | 12.7 |

The number of solubility sites is larger for the smaller species, as on the average there will be more sites available to accommodate smaller sized species. The jump frequencies are inversely proportional to the molecular weight of the species, as lighter species vibrate faster in their equilibrium sites. The size of the solubility sites is smaller than 0.3 nm, as CO$_2$, CO and CH$_4$ do not permeate. The results obtained can be compared to values for silica membranes with the same jump distance (0.8 nm) reported in our U.S. patent application Ser. No. 10/775,288, filed Feb. 10, 2004.

TABLE 13

Calculated Parameters for Pure Silica Membrane

| Gases | N$_s$ (sites m$^{-3}$) | v* (s$^{-1}$) | E$_a$ (kJ mol$^{-1}$) |
|---|---|---|---|
| He | 6.79 × 10$^{26}$ | 8.59 × 10$^{12}$ | 4.07 |
| H$_2$ | 4.01 × 10$^{26}$ | 1.13 × 10$^{13}$ | 8.90 |
| Ne | 5.00 × 10$^{26}$ | 4.40 × 10$^{12}$ | 8.75 |

Compared to silica membranes with the same jump distance, the number of solubility sites in the membrane is slightly larger, implying that the structure of the composite is a little more restrictive. The jump frequencies are similar, indicating a similar environment as in silica membranes. The activation energies are higher, also implying that the composite membrane has a more restrictive structure.

Example 13

This example describes the preparation of a silica-titania composite membrane deposited on the gamma-alumina multilayer substrate described in EXAMPLE 3. In this example, the silica source was TEOS vapor and the titania source was TIP (titanium isopropoxide) vapor. The same dual-element CVD apparatus for the deposition of silica-alumina membranes (FIG. 5) was employed except that TIP was used instead of ATSB (aluminum-tri-sec-butoxide). The CVD process parameters denoted as Condition VIII in Table 13 were used, and the resulting silica-titania membrane was designated composite membrane ST-VIII. TEOS was introduced through a bubbler at 296 K using Ar as a carrier gas at 3.7 μmol s$^{-1}$ on the inner side of the tubular membrane, and TIP through a bubbler at 296 K using Ar as a carrier gas at 10.9 μmol s$^{-1}$, while a flow of Ar of 17.2 μmol s$^{-1}$ was maintained on the shell side of the reactor assembly. A dilution gas at a rate of 2.4 μmol s$^{-1}$ was added so that the TEOS concentration was 19.5×10$^{-3}$ mol m$^{-3}$ and the TIP concentration was 1.94× 10$^{-3}$ mol m$^{-3}$, leading to a molar ratio of TIP/TEOS of 0.10. The CVD process was conducted for 3 h and the permeation properties at 873 K before and after CVD are listed in Table 14. After 3 h of deposition, the selectivities of H$_2$) over CH$_4$ and CO$_2$ were 38 and 58, respectively at 873 K with the H$_2$ permeance of 2.3×10$^{-7}$ mol m$^{-2}$s$^{-1}$Pa$^{-1}$, which is less selective compared with the silica-alumina membranes in Examples 5, 6 and 7.

The hydrothermal stability test was conducted at 873 K by exposure of the freshly prepared membrane ST-VIII to an environment consisting of 16 mol % water and 84 mol % argon gas for 126 h, as described in Example 10 for the silica-alumina membrane. After 126 h of exposure, the $H_2$ permeance through the silica-titania membrane was decreased by 17%. In comparison to the reduction of 90% for the pure silica membrane and 38-68% for the silica-alumina membranes tested at the same test conditions in Example 10, the silica-titania membrane showed better hydrothermal stability than the pure silica membrane and the silica-alumina membrane.

TABLE 14

CVD Process Parameters for the Preparation of Silica-Titania Membranes

| | Cond. VIII | Cond. IX |
|---|---|---|
| TEOS Bath Temp. (K) | 296 | 296 |
| TIP Bath Temp. (K) | 296 | 296 |
| TEOS Carrier Gas (µmol s$^{-1}$) | 3.7 | 3.7 |
| TIP Carrier Gas (µmol s$^{-1}$) | 10.9 | 5.5 |
| Dilute Gas (µmol s$^{-1}$) | 2.4 | 8.0 |
| Balance Gas (µmol s$^{-1}$) | 17.2 | 17.1 |
| TEOS concen. × 10$^3$ (mol m$^{-3}$) | 19.5 | 19.3 |
| TIP concen. × 10$^3$ (mol m$^{-3}$) | 1.94 | 0.97 |
| TIP/TEOS (molar ratio) | 0.10 | 0.05 |
| Deposition Temp. (K) | 873 | 923 |

TABLE 15

Gas Permeation Properties of a Silica-Titania Composite Membrane Before and After Dual-Element CVD at 873 K

| Permeation properties | | Multilayer substrate | ST-VIII (3 h-CVD) |
|---|---|---|---|
| Permeance (mol m$^{-2}$ s$^{-1}$ Pa$^{-1}$) | $H_2$ | 5.4 × 10$^{-5}$ | 2.3 × 10$^{-7}$ |
| | $CH_4$ | 2.3 × 10$^{-5}$ | 6.1 × 10$^{-9}$ |
| | $CO_2$ | 1.4 × 10$^{-6}$ | 4.0 × 10$^{-9}$ |
| Selectivity | $H_2/CH_4$ | 2.6 | 38 |
| | $H_2/CO_2$ | 4.4 | 57 |

Example 14

This example describes another silica-titania composite membrane formed on the gamma-alumina multilayer substrate described in EXAMPLE 3. CVD condition IX listed in Table 13 was used and the resulting composite membrane was designed ST-IX. In this example, the TEOS concentration was around 19×10$^3$ mol m$^{-3}$, the same as in EXAMPLE 12, but a lower molar ratio of TIP/TEOS of 0.05 and higher deposition temperature of 923 K were employed. The CVD process was conducted for 3 h and 5 h. After 3 h of CVD at 923 K, the membrane ST-IX showed a $H_2$ permeance of 2.0×10$^{-7}$ mol m$^{-2}$s$^{-1}$Pa$^{-1}$ at 923 K with the selectivities of $H_2$ over $CH_4$ and $CO_2$ of 16 and 26, respectively. With another 2 h of deposition, the $H_2$ permeance decreased but the selectivities kept unchanged.

Figure 13:
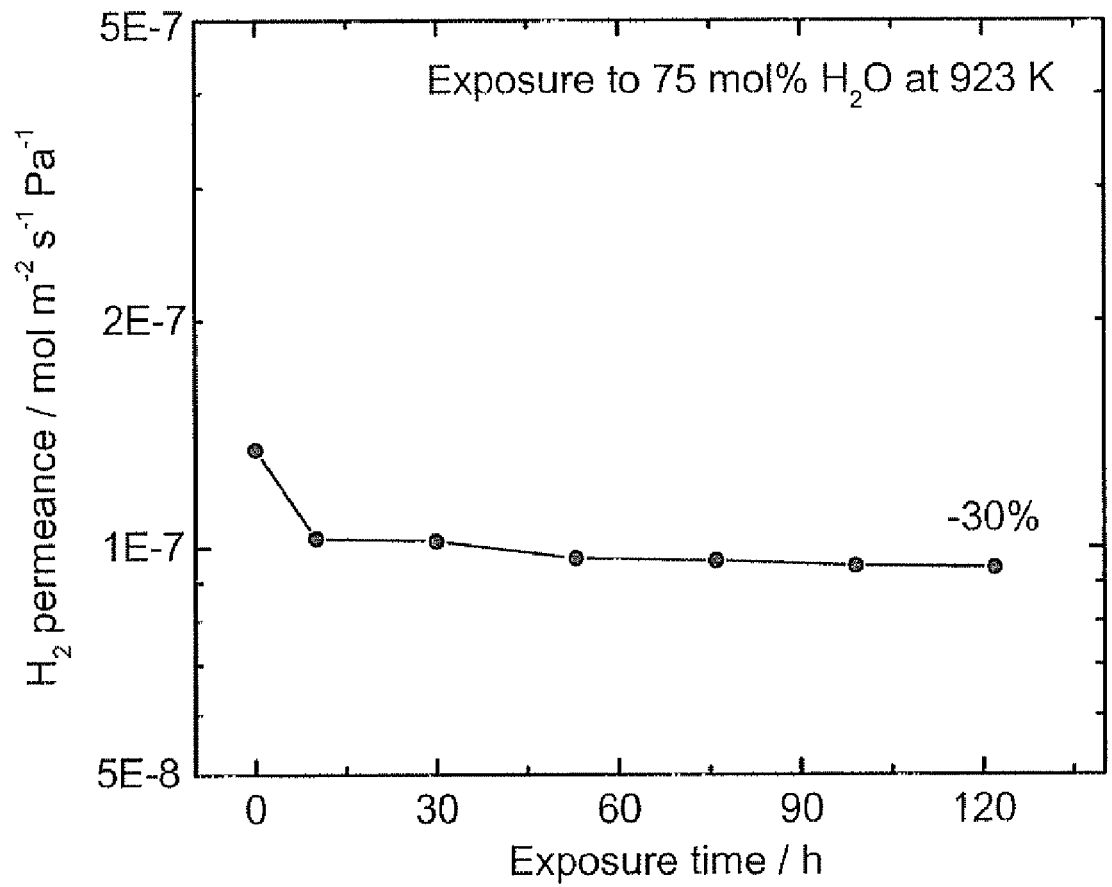
FIG. 13 is a plot showing changes in $H_2$ permeance of composite silica-titania membranes prepared at 923 K using molar ratios of ATSB/TEOS of 0.05.

The hydrothermal stability of the composite membrane ST-IX was tested under very harsh conditions with a much higher concentration of water vapor (75 mol % water and 25 mol % argon gas) and higher temperature (923 K). The membrane was exposed to 75 mol % water vapor at 923 K for 126 h. Significantly, as shown in FIG. 13, the $H_2$ permeance through the membrane was reduced by around 24% after the first 10 h, and then was mostly stabilized in the range of 24-30% during the remaining hours, and maintained a near-constant permeance in the order of 10$^{-7}$ mol m$^{-2}$s$^{-1}$Pa$^{-1}$.

TABLE 16

Gas Permeation Properties of a Silica-Titania Composite Membrane Before and After Dual-Element CVD at 923 K

| Permeation properties | | Multilayer substrate | ST-IX 3 h-CVD | ST-IX 5 h-CVD |
|---|---|---|---|---|
| Permeance (mol m$^{-2}$ s$^{-1}$ Pa$^{-1}$) | $H_2$ | 3.2 × 10$^{-5}$ | 2.0 × 10$^{-7}$ | 1.4 × 10$^{-7}$ |
| | $CH_4$ | 1.3 × 10$^{-5}$ | 1.3 × 10$^{-8}$ | 8.4 × 10$^{-9}$ |
| | $CO_2$ | 7.3 × 10$^{-6}$ | 7.6 × 10$^{-9}$ | 5.7 × 10$^{-9}$ |
| Selectivity | $H_2/CH_4$ | 2.5 | 16 | 16 |
| | $H_2/CO_2$ | 4.4 | 26 | 24 |

Figure 14:
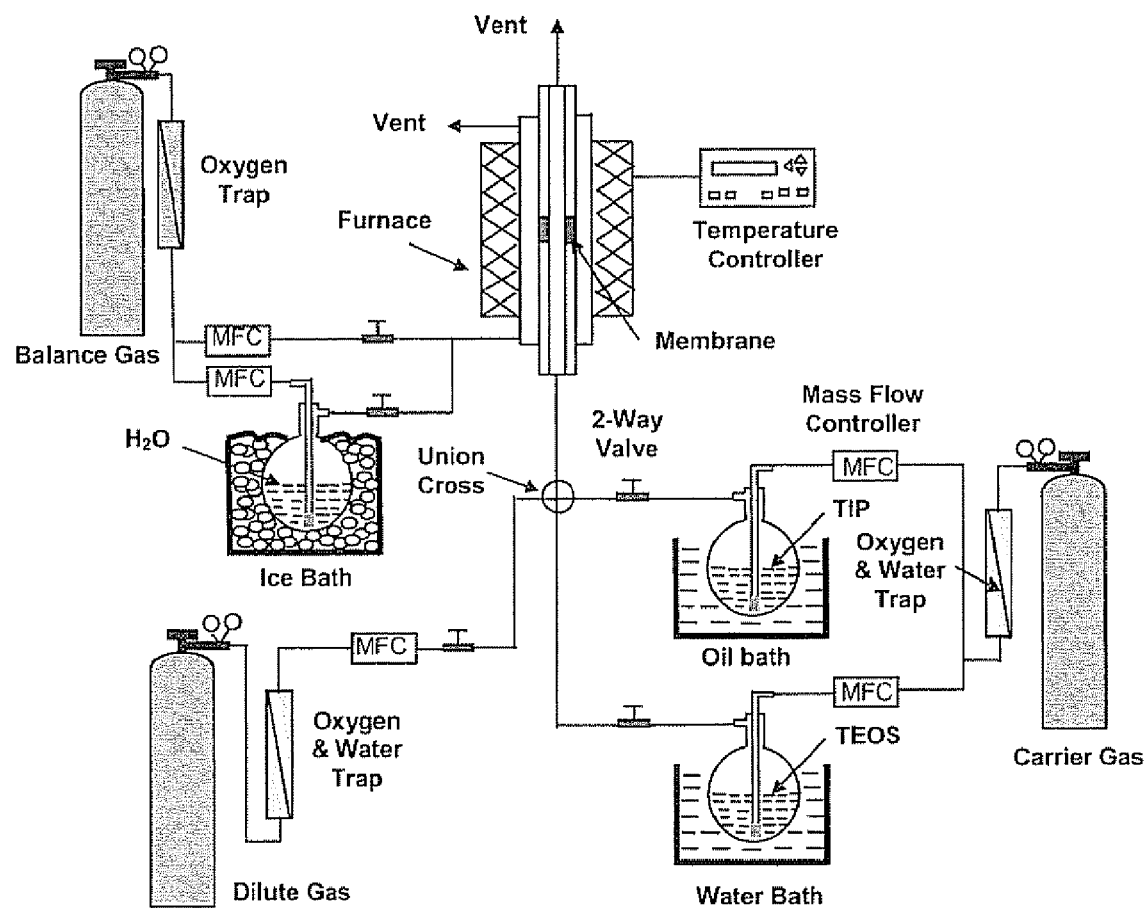
FIG. 14 is a schematic illustration of a multi-element CVD apparatus using opposing reactants technique (ORT) for use in the deposition of titania-silica layers.

In order to extend the standard-CVD preparation method we developed an alternative method that employs water vapor to assist and control the decomposition of the precursors. In this opposing reactants technique (ORT), the water vapor is made to permeate from the opposite side of the membrane, so that the Si and Ti precursors (TEOS and TIP) do not decompose on the gas-phase. The setup is shown in FIG. 14, which is a schematic diagram of a multi-element CVD apparatus operating with opposing reactants for use in the deposition of a titania-silica layer. The diluting gas stream was mixed with the TIP and TEOS carrier gas flows and was introduced on the inner side of the support (tube side). A water vapor carrier gas flow was passed through a bubbler filled with water (273 or 296 K), premixed with the balance gas flow and then introduced on the outer side of the support (shell side). The water vapor content in the shell side was adjusted by controlling the water bath temperature and flow rate. The deposition temperature was varied from 773-873 K. Table 17 lists the process parameters for the preparation of $TiO_2$—$SiO_2$ membranes by this opposing reactants technique using different $H_2O$ concentrations (0.27 and 1.2 mol %). The TEOS concentration was fixed at 0.047 mol % and the molar ratio of TIP/TEOS at 0.065. The $TiO_2$—$SiO_2$ membranes prepared at 773 K by the opposing reactants technique using low (0.27 mol %) and high (1.2 mol %) water vapor concentrations were denoted as ST-L-773 and ST-H-773, respectively.

TABLE 17

Opposing Reactants Technique Assisted CVD Process Parameters for the Preparation of Titania-Silica Membranes (CVD temperature: 673, 773 or 873 K)

| Membrane | 065ST-L | 065ST-H |
|---|---|---|
| TEOS bath temp. (K) | 296 | 296 |
| TIP bath temp. (K) | 296 | 296 |
| Water vapor bath temp. (K) | 273 | 296 |
| TEOS carrier gas (µmol s$^{-1}$) | 3.7 | 3.7 |
| TIP carrier gas (µmol s$^{-1}$) | 7.2 | 7.2 |
| Diluting gas (µmol s$^{-1}$) | 6.4 | 6.4 |
| Water vapor carrier gas | 9.6 | 9.6 |
| Balance gas (µmol s$^{-1}$) | 7.7 | 7.7 |
| TEOS conc. (mol %) | 0.047 | 0.047 |
| TIP conc. (mol %) | 0.0031 | 0.0031 |
| TIP/TEOS (molar ratio) | 0.065 | 0.065 |
| Water vapor conc. (mol %) | 0.27 | 1.22 |

Example 15

Figure 15:
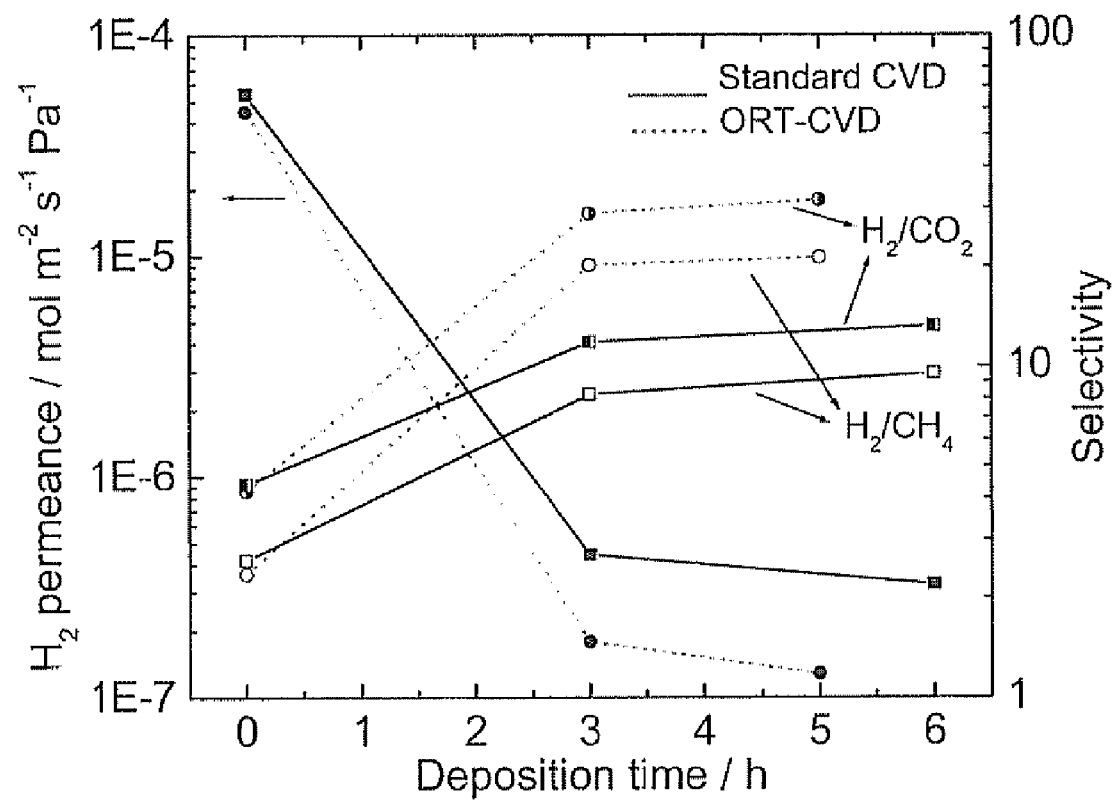
FIG. 15 is a plot showing changes in $H_2$ permeance and $H_2$/$CH_4$ selectivity with the deposition time of composite membranes prepared at 873 K by using a standard CVD and ORT-assisted CVD.

FIG. 15 compares changes with deposition time of the permeation properties through a standard-CVD derived titania-silica membrane ST-873 and an ORT assisted-CVD (ORT-CVD) derived membrane ST-L-873 using a low concentration of water vapor (0.27 mol %). These two composite membranes were prepared at the same temperature (873 K) and the same molar ratio of TIP/TEOS (0.065). Clearly, the opposing reactants technique improves the selectivity properties. After 3 h of deposition, the $H_2$ selectivities over $CH_4$ and CO, were 20 and 29, respectively for the ORT-CVD derived membrane, while they were 8.2 and 12 for the standard-CVD derived membrane. The $H_2$ permeance though the ORT-CVD membrane, however, was slightly lower, $1.3 \times 10^{-7}$ vs $3.3 \times 10^{-7}$ mol $m^{-2}s^{-1}Pa^{-1}$. Overall, the introduction of water vapor improves the membrane properties.

Figure 16:
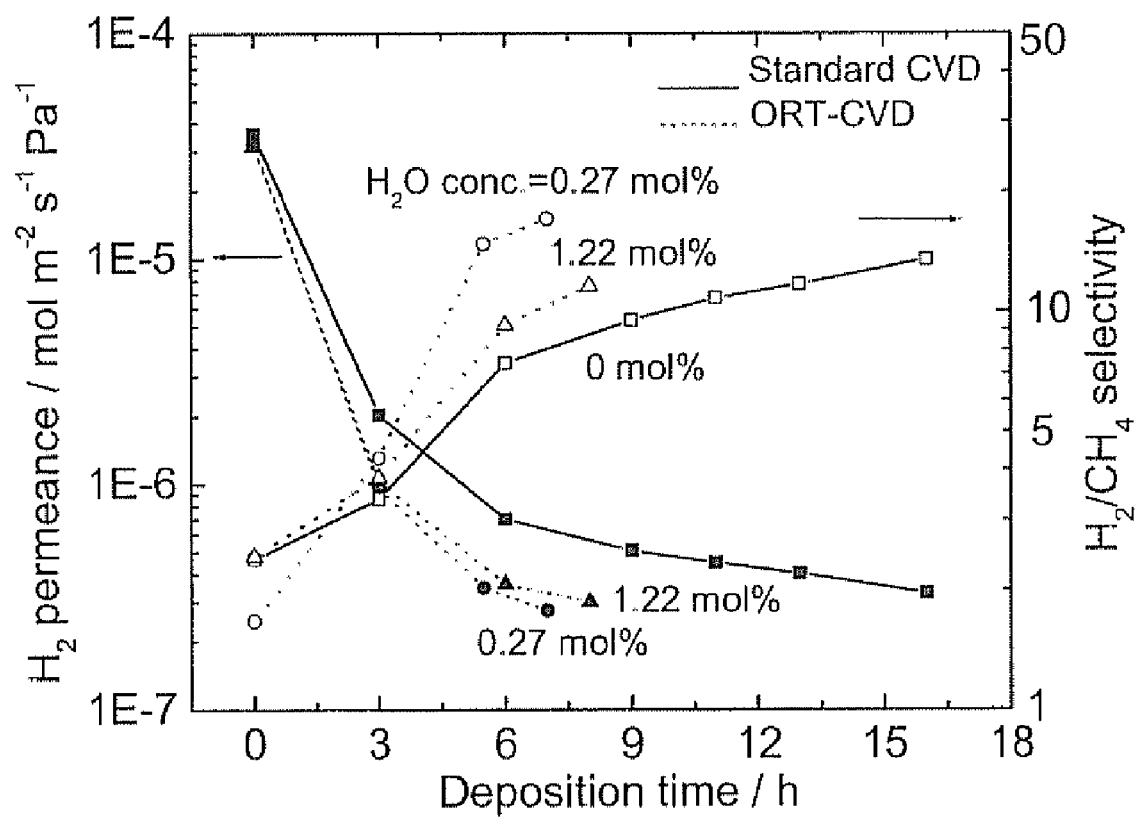
FIG. 16 is a plot showing changes in $H_2$ permeance and $H_2$/$CH_4$ selectivity with the deposition time of three composite membranes prepared at 773 K by using a standard CVD and ORT-assisted CVD with the use of different water concentration.

FIG. 16 shows the effect of water vapor concentration on $H_2$ permeance and $H_2/CH_4$ selectivity with the deposition time of three composite membranes prepared at 773 K by using a standard CVD and an opposing reactants technique assisted CVD. The figure displays changes in the permeation properties through the composite membranes prepared at the low temperature of 773 K without and with introduction of low (0.27 mol %) and high (1.22 mol %) water vapor concentrations. The presence of water vapor at 773 K not only shortened the deposition time by at least half, but also improved the selectivity while maintaining the permeance. After 7 h of CVD, the membrane ST-L-773 prepared with the low water vapor concentration showed a $H_2/CH_4$ selectivity of 17 with a $H_2$ permeance of $2.8 \times 10^{-7}$ mol $m^{-2}s^{-1}Pa^{-1}$ at 773 K, while it took 16 h for the membrane ST-773 without introduction of water vapor to obtain a $H_2/CH_4$ selectivity of 14 with a $H_2$ permeance of $3.3 \times 10^{-7}$ mol $m^{-2}s^{-1}Pa^{-1}$ at 773 K. The higher water vapor concentration reduced the selectivity, although it had almost no effect on the permeance for $H_2$. This may have been due to excessive passage of the water to the side of the membrane with the TEOS and TIP components resulting in the homogeneous decomposition of those reactants.

Example 16

Figure 17:
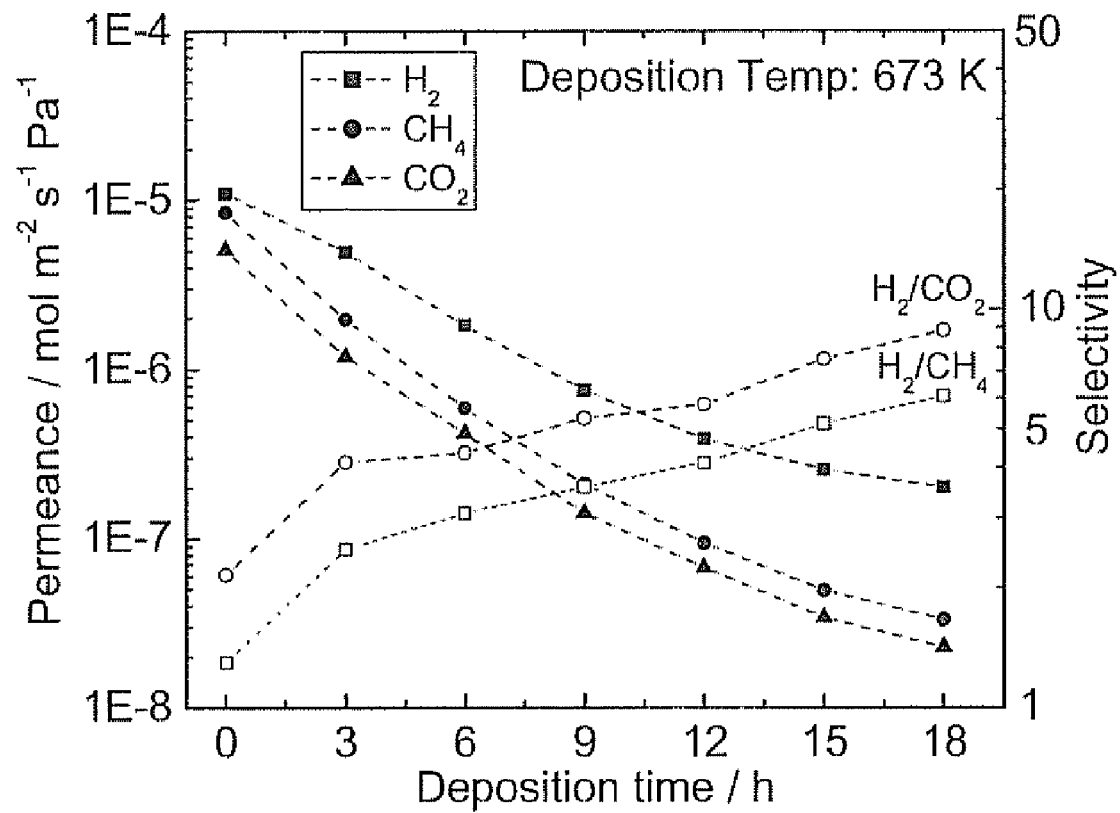
FIG. 17 is a plot showing changes of permeances and selectivities with the deposition time of a composite membrane prepared at 673 K by using ORT-assisted CVD.

The opposing reactants technique allows preparation of membranes at low temperatures. FIG. 17 shows the properties of a membrane prepared at 673 K. The figure displays the permeance and selectivity through a titania-silica composite membrane ST-L-673 prepared by ORT assisted CVD as a function of deposition time. This membrane was prepared using a molar ratio of TIP/TEOS of 0.065, and TEOS and water vapor concentrations of 0.047 mol % and 0.27 mol %, respectively. With the use of water vapor the permeance for $H_2$ was reduced more slowly than that for $CH_4$ and $CO_2$, thus leading to a continuous increase in $H_2$ selectivity. After 18 h of deposition, the $H_2/CO_2$ selectivity was improved from 2.2 to 8.9 and the $H_2$ permeance was as high as $2.0 \times 10^{-7}$ mol $m^{-2}s^{-2}Pa^{-1}$ at 673 K. Compared with the results of the deposition at 773 and 873 K in FIGS. 16 and 17, much longer time is required to obtain a selective composite membrane, but the performance is not enhanced.

Example 17

Figure 18:
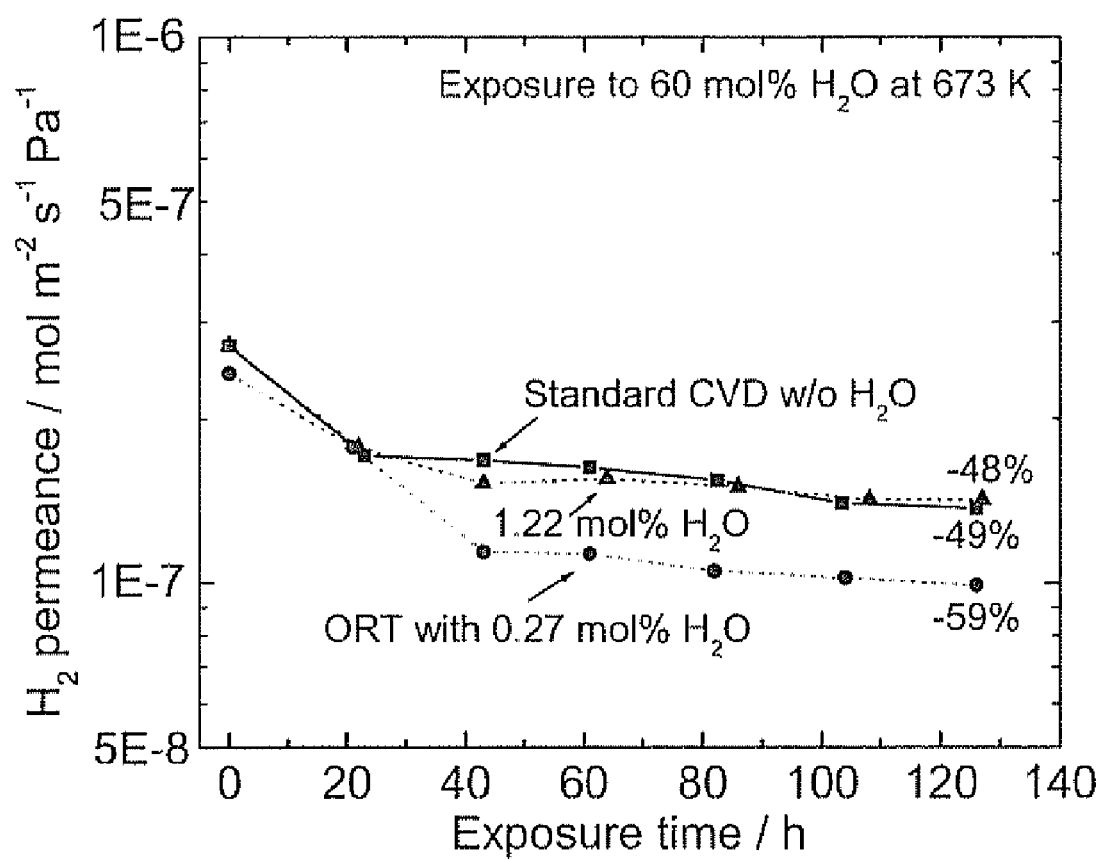
FIG. 18 is a plot showing the effect of water vapor on changes in $H_2$ permeance during exposure to 60 mol % $H_2O$ at 673 K for three composite membranes prepared at 773 K by using a standard CVD and an ORT-CVD.

FIG. 18 shows the effect of water vapor on the $H_2$ permeance of composite titania-silica membranes prepared at 773 K using standard CVD and ORT-CVD. The membranes were exposed to 60 mol % water vapor at 673 K for 130 h. These three membranes showed similar behavior in their the resistance to water vapor, probably due to the use of the same preparation conditions including deposition temperature and molar ratio of TIP/TEOS. They suffered the most significant loss of permeance in the initial states, i.e., the first 20 h. After 40 h of exposure to water vapor, the $H_2$ permeance of the composite membranes stabilized. The total reduction of $H_2$ permeance for an exposure of 130 h is in the range of 50-60%. For comparison, the $H_2$ permeance of a pure CVD-derived silica membrane suffered 90% reduction after exposure to 50 mol % water vapor at 673 K for 100 h.

Example 18

Figure 19:
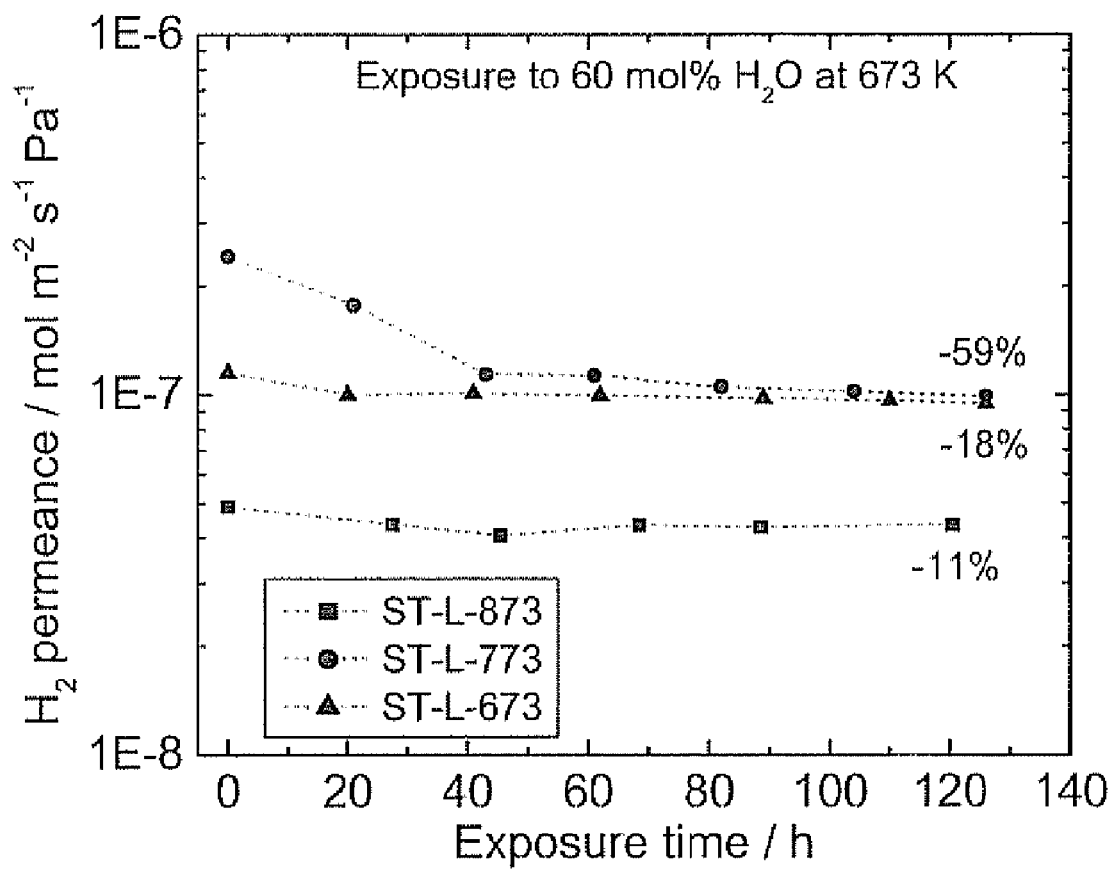
FIG. 19 is a plot showing changes in HF permeance during the exposure to 60 mol % $H_2O$ at 673 K for three composite membranes prepared at 673-873 K by using ORT-assisted CVD.

FIG. 19 shows the effect of the deposition temperature on $H_2$ permeance during the exposure to 60 mol % $H_2O$ at 673 K for three composite membranes prepared at 673-873 K using an ORT-assisted CVD. Interestingly, the membrane ST-L-873 prepared at 873 K showed very strong hydrothermal stability. After exposure to a stream containing 60 mol % water vapor at 673 K for over 120 h, the $H_2$ permeance through ST-L-873 almost did not change. Its lower permeance is due to the use of the lower permeation temperature (673 K) in comparison to its deposition temperature (873 K).

Example 19

Figure 20:
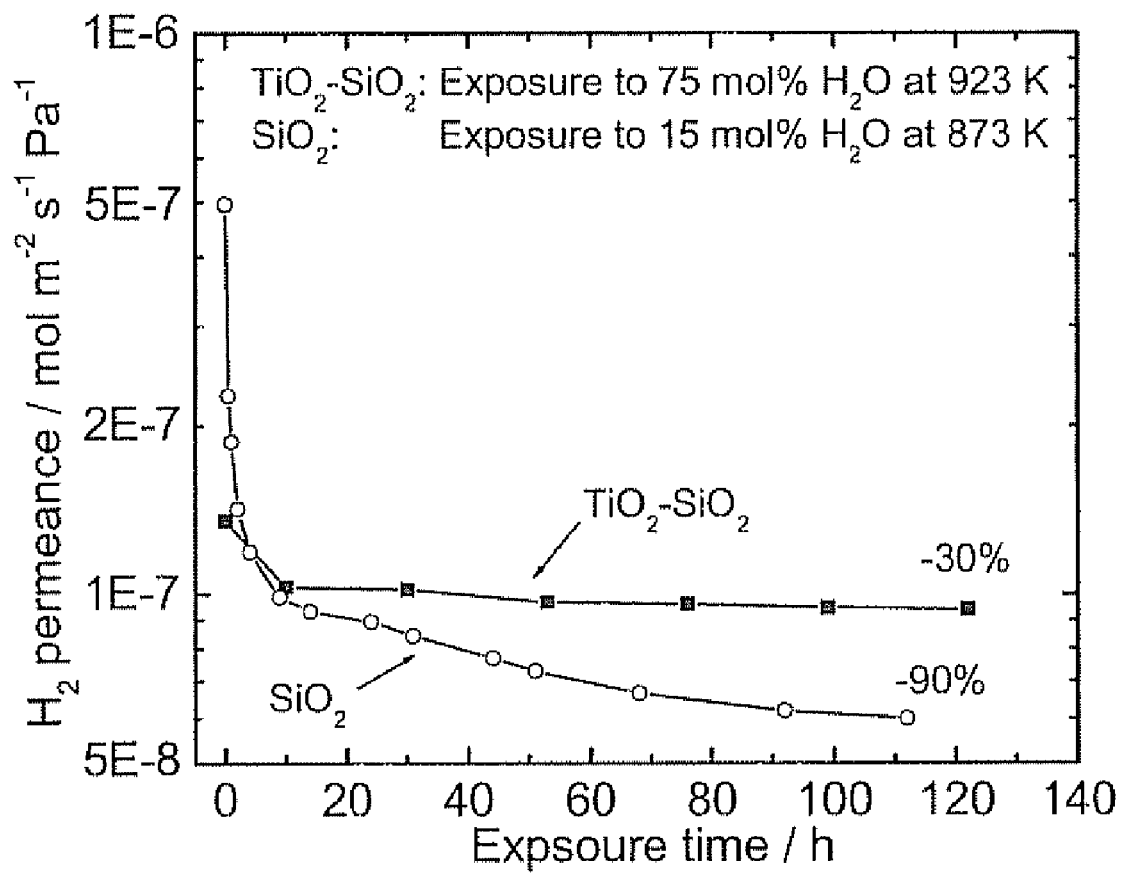
FIG. 20 is a plot showing changes in $H_2$ permeance during the exposure to 75 mol % $H_2O$ at 923 K for a composite membrane prepared at 923 K by a standard CVD with the use of molar ratio of TIP/TEOS of 0.065.

In order to further investigate the hydrothermal stability of these composite membranes at very harsh conditions, the membrane ST-923 prepared at 923 K was exposed at 923 K to a stream containing 75 mol % water vapor. FIG. 20 shows the changes in $H_2$ permeance during exposure to 75 mol % $H_2O$ at 923 K for a composite membrane prepared at 923 K by a standard CVD with the use of a molar ratio of TIP/TEOS of 0.065. Significantly, as shown in FIG. 20, the $H_2$ permeance through this membrane was reduced to around 24% in the first 10 h, and then was stabilized in the range of 24-30% for the remaining 122 h of the test and still kept a permeance in the order of $10^{-7}$ mol $m^{-2}s^{-1}Pa^{-1}$. In comparison a pure silica membrane at milder conditions of 873 K at 15 mol % water underwent a drop of permeance of 90% to $6 \times 10^{-8}$ mol $m^{-2}s^{-1}Pa^{-1}$. The addition of the titania to the silica resulted in membranes of excellent permeability and stability.

Theory

Figure 21:
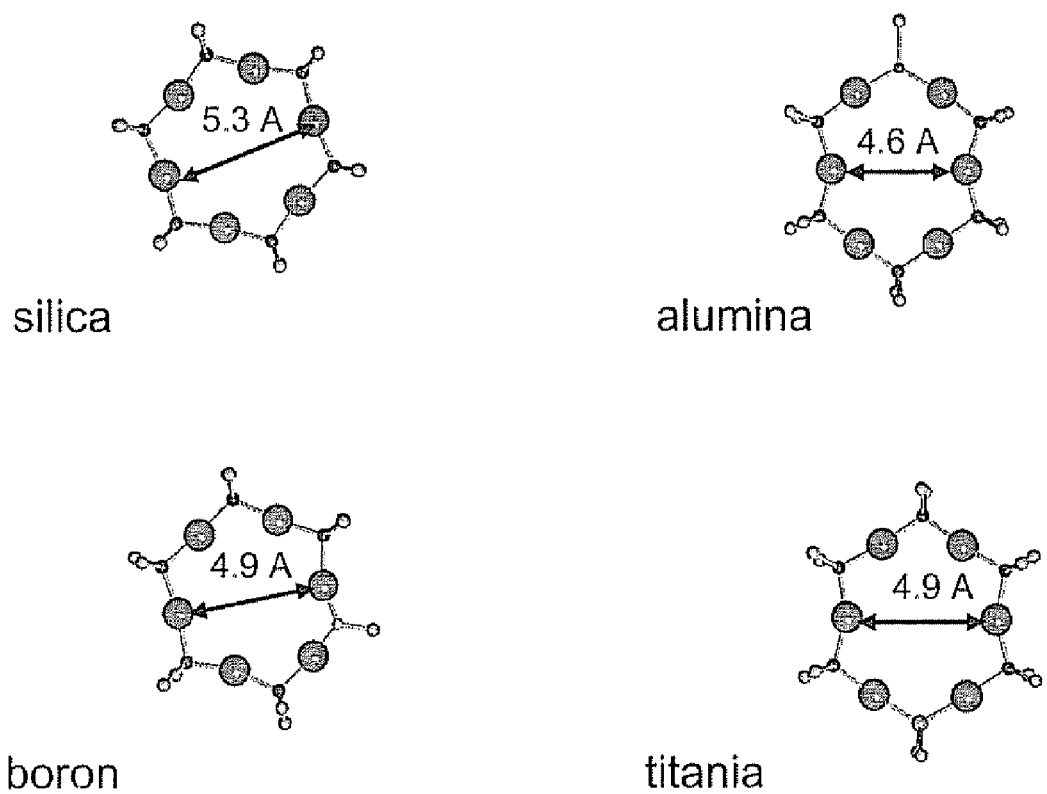
FIGS. 21-23 are illustrations of optimized structures of 6-membered silica rings containing Al, B, and Ti, 7-membered silica rings containing Al, B. and Ti, and 6- and 7-membered silica rings containing Y and Zr, respectively.
Figure 22:
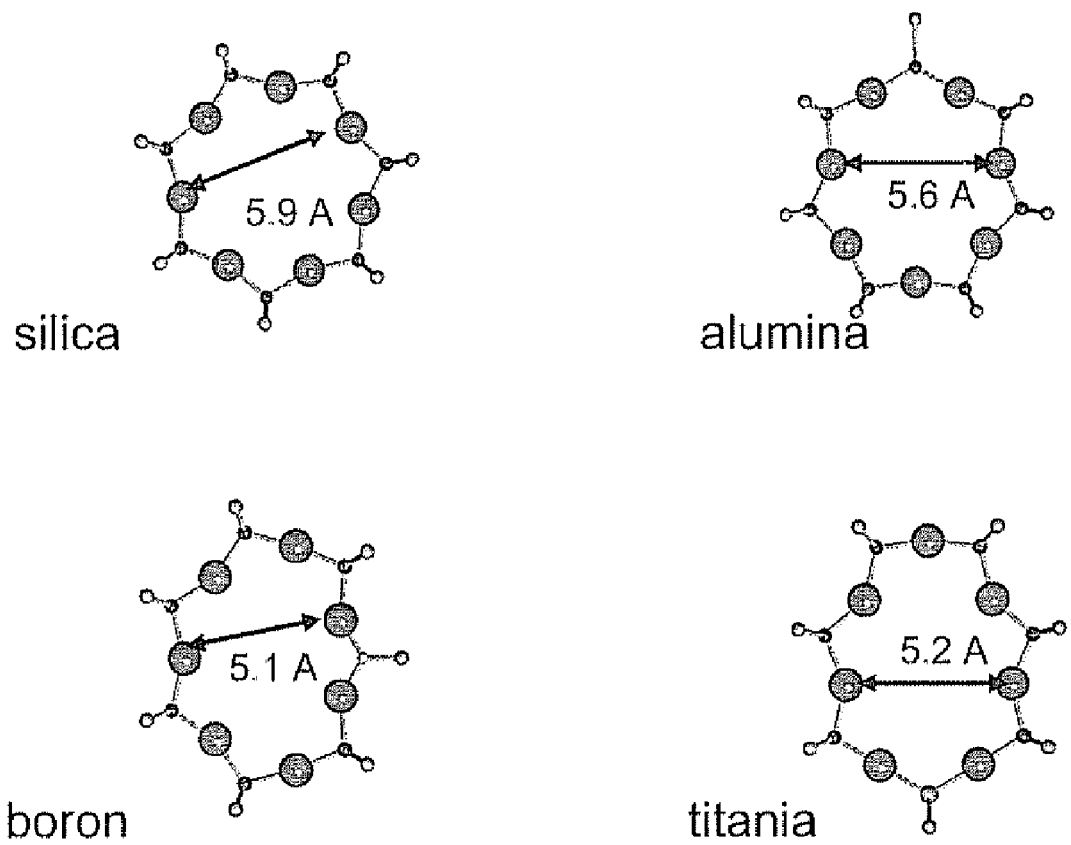
Figure 23:
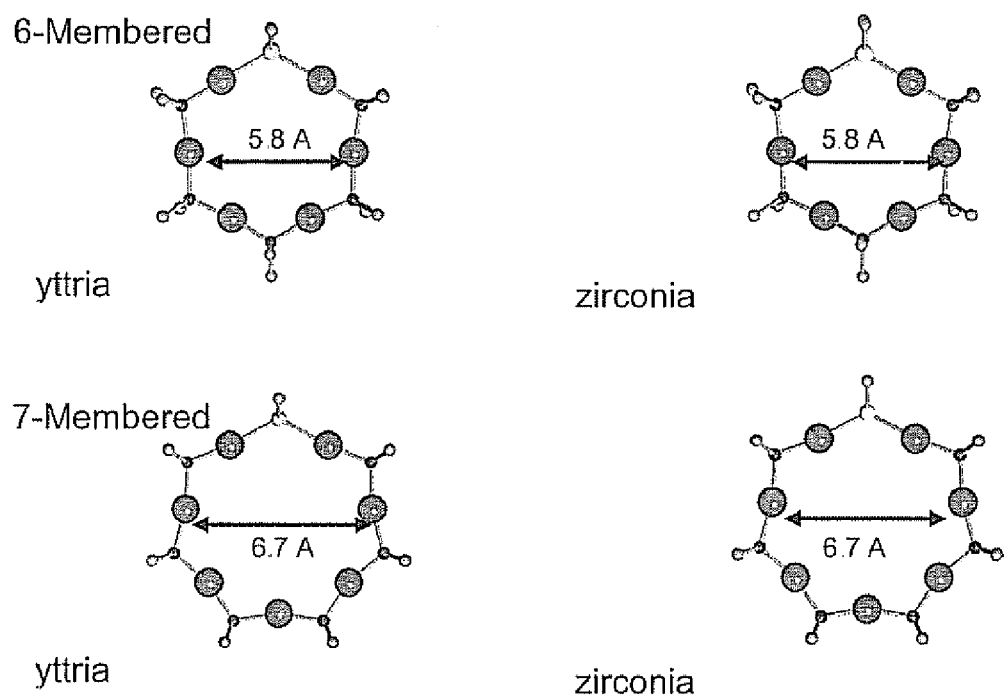

The permeation properties of the membranes can be calculated using theoretical methods. This section presents results of ab initio calculations of activation energies made using a model of the structure of the silica membrane in which sorption sites are taken to be randomly placed in the silica structure. On jumping from site to site, the permeating species are considered to pass through a single critical ring opening. A hybrid functional of the density functional theory (DFT) method with a highly accurate basis set is used to optimize ring structures and the gas species. The silica rings were considered to have 6 and 7 members $H_{2n}Si_nO_n$ (n=6,7) with various elemental substitutions including Al, Ti, B, Y, and Zr, and are shown in FIGS. 21-23. The geometries of the ring clusters were obtained by energy minimization of the structures using a DFT method in Gaussian 98. The optimizations were conducted using the Becke3LYP hybrid functional with a 6-311G (2d, p) polarized basis set.

Example 20

Figure 24:
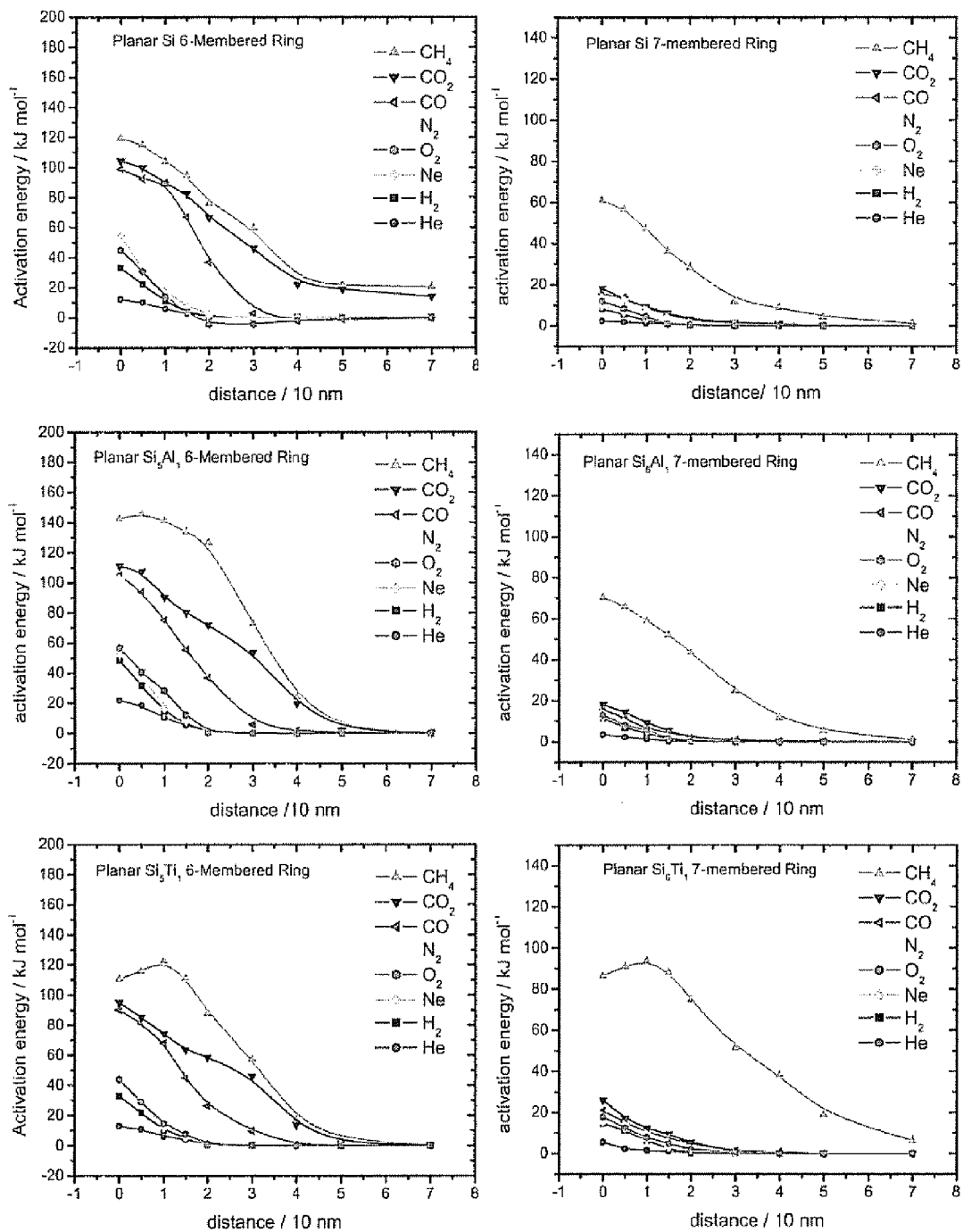
FIGS. 24-25 are a series of plots showing activation energies for permeation of various gaseous species through silica 6-membered and 7-membered rings, silica-alumina 6-membered and 7-membered rings, silica-titania 6-membered and 7-membered rings.

Calculated interaction curves for the permeation of various gases through 6-member and 7-member membranes composes of Si, Si—Al, and Si—Ti are shown in FIG. 24. The curves show that the interaction energy is highest at the center of the rings, and decreases with distance. The activation energy is the highest interaction energy and is summarized for $H_2$, $CH_4$, and $CO_2$ in Table 18. It is seen to increase in the order $H_2<CO_2<CH_4$, and to be smaller for the 7-membered rings than for the 6-membered rings. Both results are reasonable, as the molecular size order is $H_2<CO_2<CH_4$, and the 7-membered rings are larger, allowing easier passage of the species.

TABLE 18

Summary of Activation Energies for Permeation of $H_2$, $CO_2$, and $CH_4$ Through Si, Si—Al, and Si—Ti membranes

| | Activation energy of permeation/kJ mol$^{-1}$ | | | | | |
|---|---|---|---|---|---|---|
| | 6-membered rings | | | 7-membered rings | | |
| Types of rings | $H_2$ | $CO_2$ | $CH_4$ | $H_2$ | $CO_2$ | $CH_4$ |
| Silica | 27.6 | 104.3 | 119.4 | 10.7 | 18.1 | 60.9 |
| Silica-alumina | 48.6 | 111.1 | 142.6 | 11.7 | 18.1 | 76.4 |
| Silica-titania | 32.9 | 94.9 | 110.6 | 14.6 | 25.9 | 86.5 |

Example 21

Figure 25:
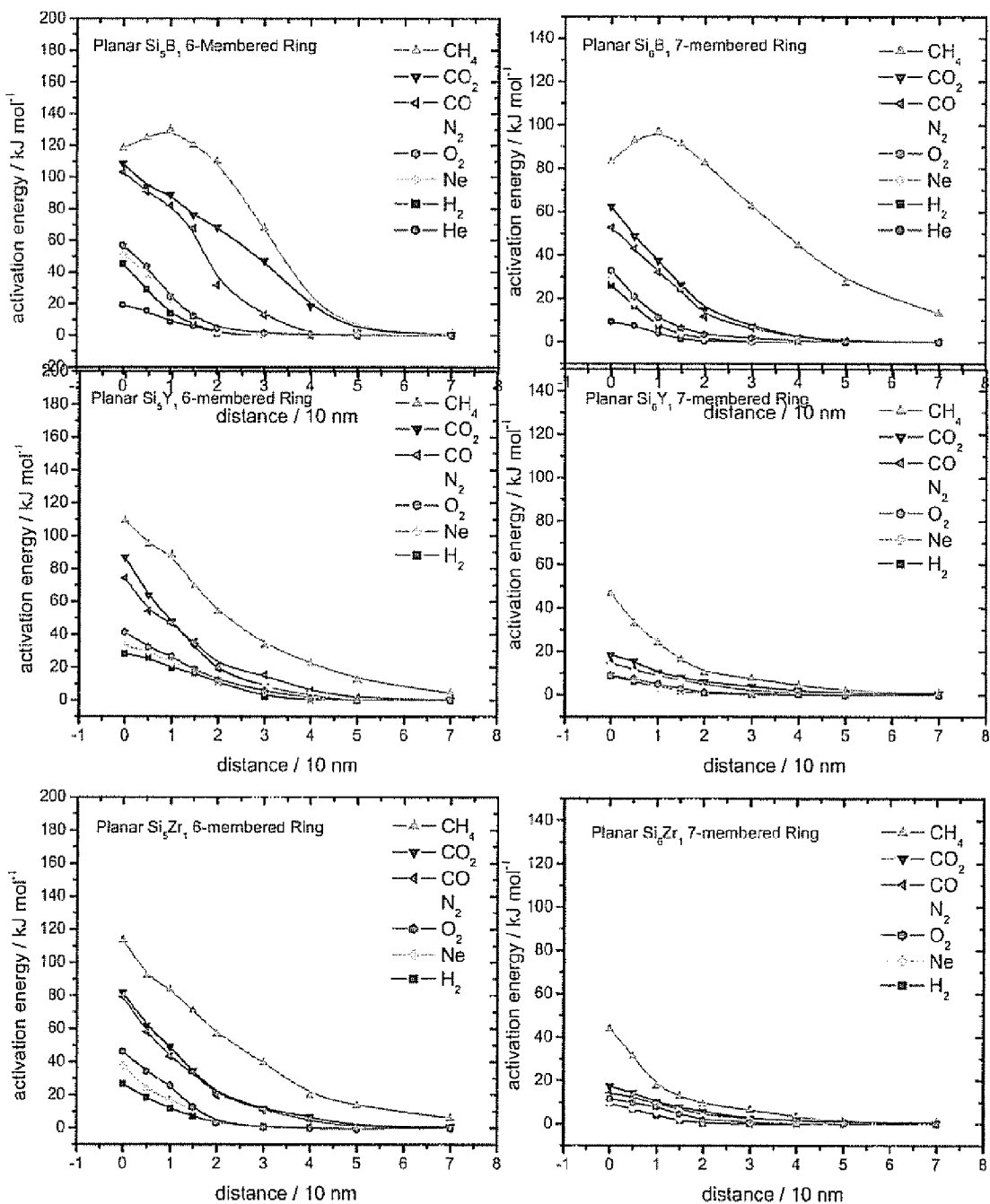

Calculated interaction curves for the permeation of various gases through 6-member and 7-member membranes composes of Si—B, Si—Y, and Si—Zr are shown in FIG. 25. The activation energies are summarized for 1-12, $CH_4$, and CO, in Table 19. As before, the activation energy increases in the order $H_2<CO_2<CH_4$, and is smaller for the 7-membered rings than for the 6-membered rings. Again, the results are understandable from the size of the permeating molecules and the size of the rings.

TABLE 19

Summary of Activation Energies for Permeation of $H_2$, $CO_2$, and $CH_4$ Through

| Si—B, Si—Y, and | Activation energy of diffusion/kJ mol$^{-1}$ | | | | | |
|---|---|---|---|---|---|---|
| Si—Zr membranes | 6-membered rings | | | 7-membered rings | | |
| Types of rings | $H_2$ | $CH_4$ | $CO_2$ | $H_2$ | $CH_4$ | $CO_2$ |
| Silica-boron | 45.1 | 108.5 | 118.3 | 26.0 | 62.3 | 83.2 |
| Silica-yttria | 28.2 | 86.8 | 109.1 | 8.70 | 18.3 | 46.8 |
| Silica-zirconia | 26.5 | 81.9 | 113.5 | 9.67 | 17.4 | 43.8 |

These examples show that the elements comprising the membranes can encompass main group elements B, Si, Al, but also related elements P, Ga, Ge, As, In, Sn, and Sb, as well as the early transition metals Y, Zr, but also the related metals Sc, Ti, V, Nb, La, Hf, Ta.

What is claimed is:

1. A composite membrane useful for the preferential permeation of gases, comprising:
   an amorphous mixed-element surface layer deposited on a uniform microporous or mesoporous substrate;
   wherein said mixed-element surface layer comprises silica and at least one oxide of an element selected from the group consisting of B, F, Al, P, Ga, Ge, As, In, Sn, Sb, Sc, Ti, V, Y, Zr, Nb, La, Hf, and Ta; and
   wherein the molar ratio of the oxide and the silica is about 0.02 to 0.11.

2. The composite membrane of claim 1, wherein the membrane incurs a drop in permeance of less than 80% upon exposure to a stream containing 60 mol % water vapor at 673 K for 120 h.

3. The composite membrane of claim 2, wherein the membrane incurs a drop in permeance of less than 50% upon exposure to a stream containing 60 mol % water vapor at 673 K for 120 h.

4. The composite membrane of claim 1, wherein the molar ratio of the oxide and the silica is about 0.02 to 0.065.

5. The composite membrane of claim 1, wherein the molar ratio of the oxide and the silica is about 0.03.

6. The composite membrane of claim 1, wherein the substrate comprises multiple layers having different particle sizes.

7. The composite membrane of claim 1, wherein the substrate comprises a material selected from the group consisting of alumina, silica, titania, magnesia, zirconia, zeolites, carbon, phosphorus, gallium, germanium, yttria, niobia, lanthana, and mixtures thereof.

8. The composite membrane of claim 1, wherein the element of the at least one oxide is Al.

9. The composite membrane of claim 1, wherein the element of the at least one oxide is Ti.

10. A method for preparing a composite membrane, comprising:
    a) providing a uniform microporous or mesoporous substrate;
    b) carrying out simultaneous deposition of mixed precursors of silica and at least one additional oxide from a mixed flow stream as to deposit an amorphous mixed-element surface layer comprising silica and at least one oxide of an element selected from the group consisting of B, F, Al, P, Ga, Ge, As, In, Sn, Sb, Sc, Ti, V, Y, Zr, Nb, La, Hi, and Ta;
    wherein the molar ratio of the oxide and the silica is about 0.02 to 0.11.

11. The method of claim 10, wherein step b) is carried out such that the membrane incurs a drop in permeance of less than 80% upon exposure to a stream containing 60 mol % water vapor at 673 K for 120 h.

12. The method of claim 11, wherein step b) is carried out such that the membrane incurs a drop in permeance of less than 50% upon exposure to a stream containing 60 mol % water vapor at 673 K for 120 h.

13. The method of claim 10, wherein step b) comprises depositing the mixed precursors by chemical vapor deposition.

14. The method of claim 13, wherein an opposing reactants technique is employed in the chemical vapor deposition.

15. The method of claim 13, wherein the chemical vapor deposition is carried out in an oxygen-free environment.

16. The method of claim 10, wherein the mixed precursors can be thermally decomposed.

17. The method of claim 16, wherein water vapor is employed to assist the thermal decomposition of the mixed precursors.

18. The method of claim 10, wherein at least one of the mixed precursors is selected from the group consisting of tetraethylorthosilicate (TEOS), tetramethylorthosilicate (TMOS), ethyltriethoxysilane, silane, chlorosilane, and combinations thereof.

19. The method of claim 10, wherein at least one of the mixed precursors is selected from the group consisting of aluminum tri-sec-butoxide (AISB), aluminum tributoxide, aluminum tri-tertbutoxide, aluminum triethoxide, aluminum chloride, and combinations thereof.

20. The method of claim 10, wherein at least one of the mixed precursors is selected from the group consisting of titanium isopropoxide (TIP), titanium alkoxides, titanium alkyls, titanium chloride, and combinations thereof.

* * * * *